United States Patent
Papasakellariou

(10) Patent No.: US 12,432,017 B2
(45) Date of Patent: Sep. 30, 2025

(54) MULTIPLEXING INFORMATION WITH DIFFERENT PRIORITY VALUES

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/475,133

(22) Filed: Sep. 26, 2023

(65) Prior Publication Data

US 2024/0022360 A1  Jan. 18, 2024

Related U.S. Application Data

(63) Continuation of application No. 17/305,306, filed on Jul. 2, 2021, now Pat. No. 11,811,538.

(60) Provisional application No. 63/057,091, filed on Jul. 27, 2020, provisional application No. 63/057,103, filed on Jul. 27, 2020.

(51) Int. Cl.
*H04L 1/1867* (2023.01)
(52) U.S. Cl.
CPC .................. *H04L 1/1887* (2013.01)
(58) Field of Classification Search
None
See application file for complete search history.

(56) References Cited

U.S. PATENT DOCUMENTS

| 2016/0212649 | A1 | 7/2016 | Chen |
| 2018/0167933 | A1 | 6/2018 | Yin |
| 2019/0215823 | A1 | 7/2019 | Kim |
| 2020/0288460 | A1 | 9/2020 | Kim |
| 2020/0322972 | A1* | 10/2020 | Hosseini ............... H04W 72/23 |
| 2021/0258981 | A1* | 8/2021 | Hosseini ............. H04W 72/566 |

(Continued)

FOREIGN PATENT DOCUMENTS

WO    2020135214 A1    7/2020

OTHER PUBLICATIONS

Extended European Search Report issued Jan. 19, 2024 regarding Application No. 21849370.8, 14 pages.

(Continued)

*Primary Examiner* — Benjamin Lamont

(57) ABSTRACT

Methods and apparatuses for multiplexing information with different priority values. A method for operating a user equipment (UE) includes determining a maximum number of resource elements (REs) of a physical uplink shared channel (PUSCH) for multiplexing first hybrid automatic repeat request acknowledgement (HARQ-ACK) information. The maximum number of REs is determined by scaling, with a factor, a total number of REs available for multiplexing the first HARQ-ACK information in the PUSCH. The PUSCH has a first priority value. The factor has a first value when the first HARQ-ACK information has the first priority value. The factor has a second value when the first HARQ-ACK information has a second priority value. The method further includes multiplexing the first HARQ-ACK information in the PUSCH over a number of REs that is smaller than or equal to the maximum number of REs and transmitting the PUSCH.

11 Claims, 12 Drawing Sheets

(56) References Cited

U.S. PATENT DOCUMENTS

| | | | |
|---|---|---|---|
| 2021/0259018 A1* | 8/2021 | Hosseini | H04L 5/0064 |
| 2021/0321394 A1 | 10/2021 | Li | |
| 2021/0329623 A1* | 10/2021 | Yoshioka | H04L 5/0044 |
| 2022/0029753 A1 | 1/2022 | Papasakellariou | |
| 2022/0078768 A1* | 3/2022 | El Hamss | H04L 5/0055 |
| 2022/0158769 A1* | 5/2022 | Gou | H04W 72/23 |
| 2022/0183025 A1* | 6/2022 | Fröberg Olsson | H04L 1/0042 |
| 2022/0191882 A1 | 6/2022 | Lee | |
| 2022/0256549 A1* | 8/2022 | Gao | H04L 1/1812 |
| 2023/0095899 A1* | 3/2023 | Yang | H04L 1/0026 |
| | | | 370/329 |

OTHER PUBLICATIONS

Sony, "Multiple HARQ-ACK PUSCH transmissions in a slot", 3GPP TSG RAN WG1 #96bis, R1-1904235, Apr. 2019, 5 pages.

Zte et al., "Remaining issues on configured grant for NR-U", 3GPP TSG RAN WG1 Meeting #99, R1-1911825, Nov. 2019, 8 pages.

3GPP TSG RAN WG1 #102-e, vivo, Intra-UE Multiplexing/Prioritization for Rel-17 Urllc, R1-2005377, pp. 1-6, Aug. 17-28, 2020 (Year: 2020).

"5G; NR; Physical channels and modulation (3GPP TS 38.211 version 16.2.0 Release 16)", ETSI TS 138 211 V16.2.0, Jul. 2020, 136 pages.

"5G; NR; Multiplexing and channel coding (3GPP TS 38.212 version 16.2.0 Release 16)", ETSI TS 138 212 V16.2.0, Jul. 2020, 154 pages.

"5G; NR; Physical layer procedures for control (3GPP TS 38.213 version 16.2.0 Release 16)", ETSI TS 138 213 V16.2.0, Jul. 2020, 180 pages.

"5G; NR; Physical layer procedures for data (3GPP TS 38.214 version 16.2.0 Release 16)", ETSI TS 138 214 V16.2.0, Jul. 2020, 167 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; Nr; Radio Resource Control (RRC); Protocol specification (3GPP TS 38.331 version 16.1.0 Release 16)", ETSI TS 138 331 V16.1.0, Jul. 2020, 886 pages.

International Search Report and Written Opinion of the International Searching Authority in connection with International Application No. PCT/KR2021/009748 dated Oct. 27, 2021, 9 pages.

CMCC, "Discsion on intraUE multiplexing" R1-1902337, 3GPP TSG RAN WG1 Meeting #96, Athens, Greece, Feb. 25-Mar. 1, 2019, 4 pages.

Nokia et al., "Revised WID: Enhanced Industrial Internet of Things (IoT) and ultra-reliable and low latency communication (URLLC) support for NR" RP-201310 (Revision of RP-193233), 3GPP TSG RAN Meeting #88e, Electronic Meeting, Jun. 29-Jul. 3, 2020, 6 pages.

* cited by examiner

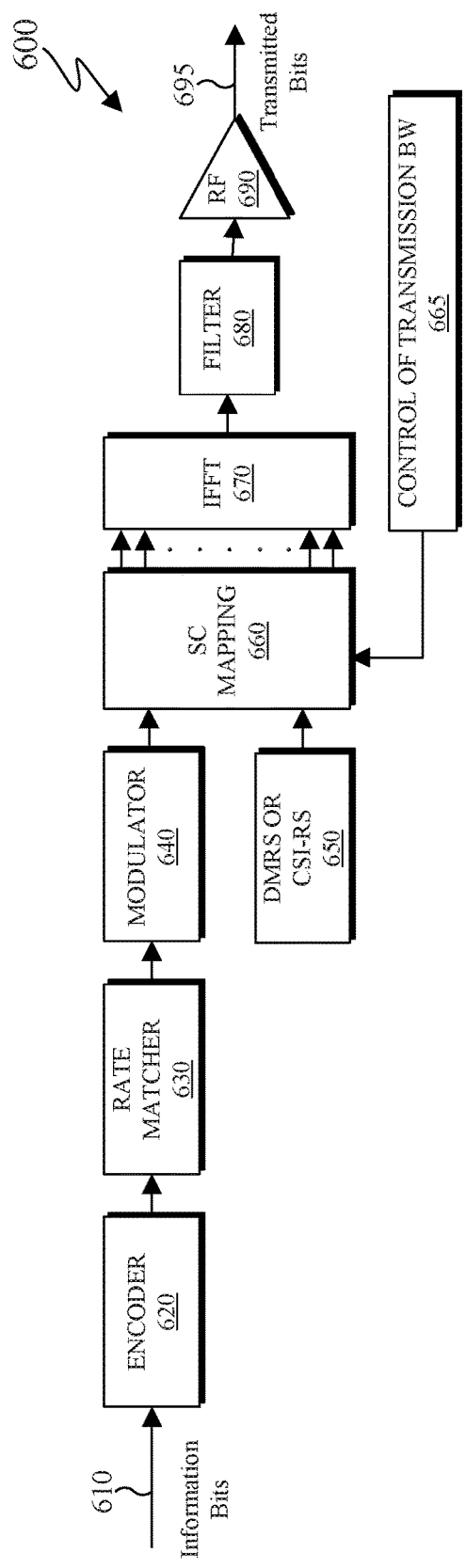
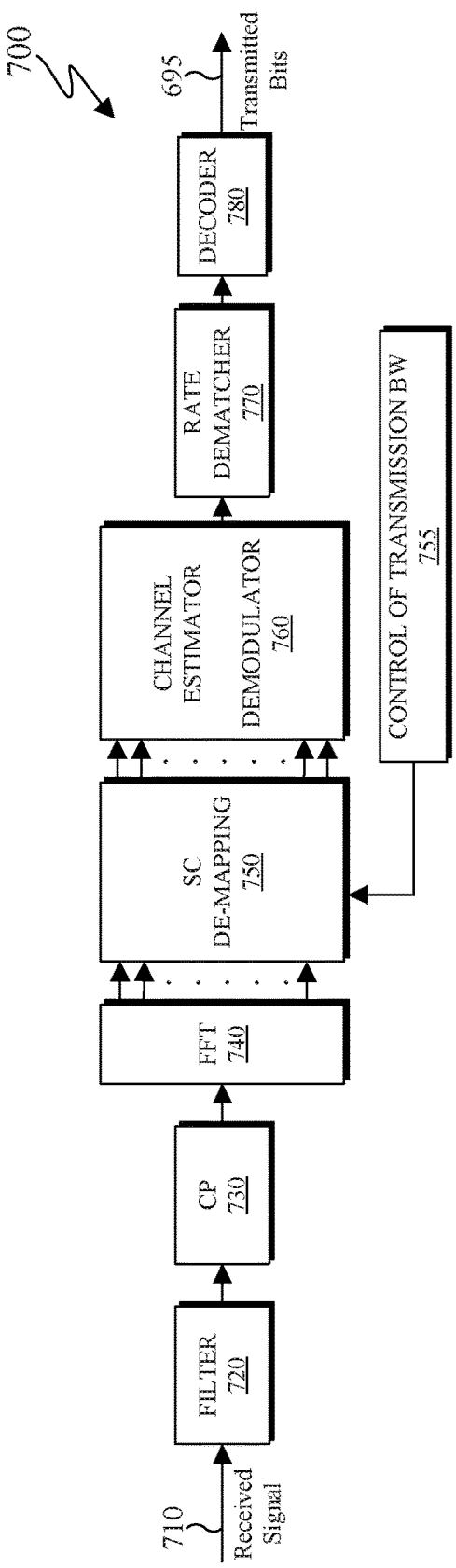
FIG. 6
FIG. 7

MULTIPLEXING INFORMATION WITH DIFFERENT PRIORITY VALUES

CROSS-REFERENCE TO RELATED APPLICATION AND CLAIM OF PRIORITY

This application is a continuation of U.S. patent application Ser. No. 17/305,306, filed on Jul. 2, 2021, which claims priority under 35 U.S.C. § 119(e) to U.S. Provisional Patent Application No. 63/057,091 filed on Jul. 27, 2020, and U.S. Provisional Patent Application No. 63/057,103 filed on Jul. 27, 2020. The above-identified provisional patent applications are hereby incorporated by reference in their entirety.

TECHNICAL FIELD

The present disclosure relates generally to wireless communication systems and, more specifically, the present disclosure relates to multiplexing information with different priority values in a physical uplink shared channel (PUSCH) or in a physical uplink control channel (PUCCH).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to multiplexing control or data information with different priority values in a physical uplink shared channel.

In one embodiment, a method is provided. The method includes determining a maximum number of resource elements (REs) of a PUSCH for multiplexing first hybrid automatic repeat request acknowledgement (HARQ-ACK) information. The maximum number of REs is determined by scaling, with a factor, a total number of REs available for multiplexing the first HARQ-ACK information in the PUSCH. The PUSCH has a first priority value. The factor has a first value when the first HARQ-ACK information has the first priority value. The factor has a second value when the first HARQ-ACK information has a second priority value. The method further includes multiplexing the first HARQ-ACK information in the PUSCH over a number of REs that is smaller than or equal to the maximum number of REs and transmitting the PUSCH.

In another embodiment, a user equipment (UE) is provided. The UE includes a processor configured to determine a maximum number of REs of a PUSCH for multiplexing first HARQ-ACK information. The maximum number of REs is determined by scaling, with a factor, a total number of REs available for multiplexing the first HARQ-ACK information in the PUSCH. The PUSCH has a first priority value. The factor has a first value when the first HARQ-ACK information has the first priority value. The factor has a second value when the first HARQ-ACK information has a second priority value. The processor is further configured to multiplex the first HARQ-ACK information in the PUSCH over a number of REs that is smaller than or equal to the maximum number of REs. The BS further includes a transceiver operably connected to the processor. The transceiver is configured to transmit the PUSCH.

In yet another embodiment, a base station (BS) is provided. The BS includes a transceiver configured to receive a PUSCH and a processor operably connected to the transceiver. The processor is configured to determine a maximum number of REs of a PUSCH for de-multiplexing first HARQ-ACK information. The maximum number of REs is determined by scaling, with a factor, a total number of REs available for multiplexing the first HARQ-ACK information in the PUSCH. The PUSCH has a first priority value. The factor has a first value when the first HARQ-ACK information has the first priority value. The factor has a second value when the first HARQ-ACK information has a second priority value. The processor is further configured to de-multiplex the first HARQ-ACK information from the PUSCH over a number of REs that is smaller than or equal to the maximum number of REs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a block diagram of an example transmitter structure using orthogonal frequency division multiplexing (OFDM) according to embodiments of the present disclosure;

FIG. 7 illustrates a block diagram of an example receiver structure using OFDM according to embodiments of the present disclosure;

DETAILED DESCRIPTION

Figure 1:
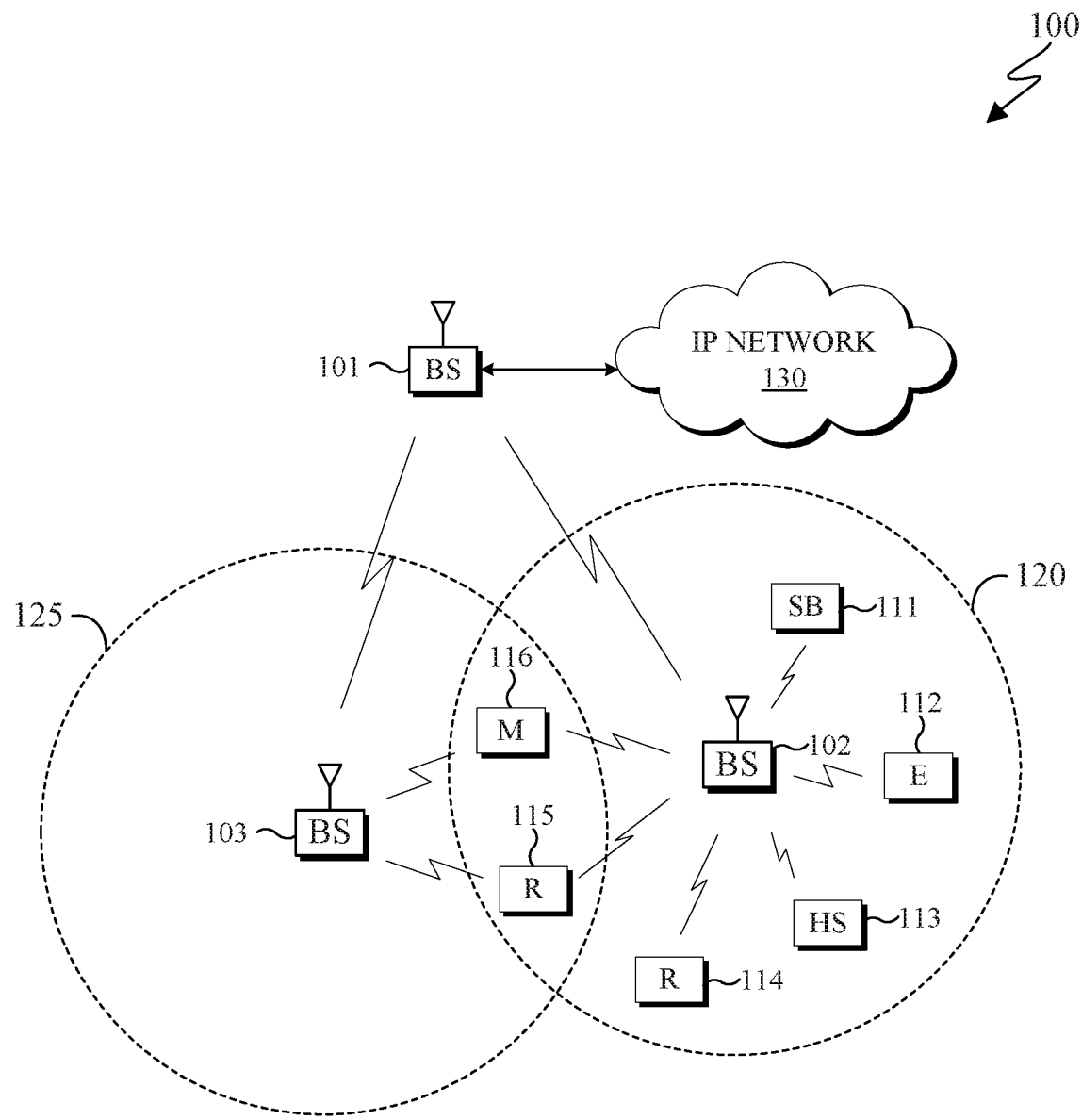
FIG. 1 illustrates an example wireless network according to embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.2.0, "NR; Physical channels and modulation" ("REF 1"), 3GPP TS 38.212 v16.2.0, "NR; Multiplexing and Channel coding" ("REF 2"), 3GPP TS 38.213 v16.2.0, "NR; Physical Layer Procedures for Control" ("REF 3"), 3GPP TS 38.214 v16.2.0, "NR; Physical Layer Procedures for Data" ("REF 4"), 3GPP TS 38.321 v16.1.0, "NR; Medium Access Control (MAC) protocol specification" ("REF 5"), and 3GPP TS 38.331 v16.1.0, "NR; Radio Resource Control (RRC) Protocol Specification" ("REF 6").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals.

Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
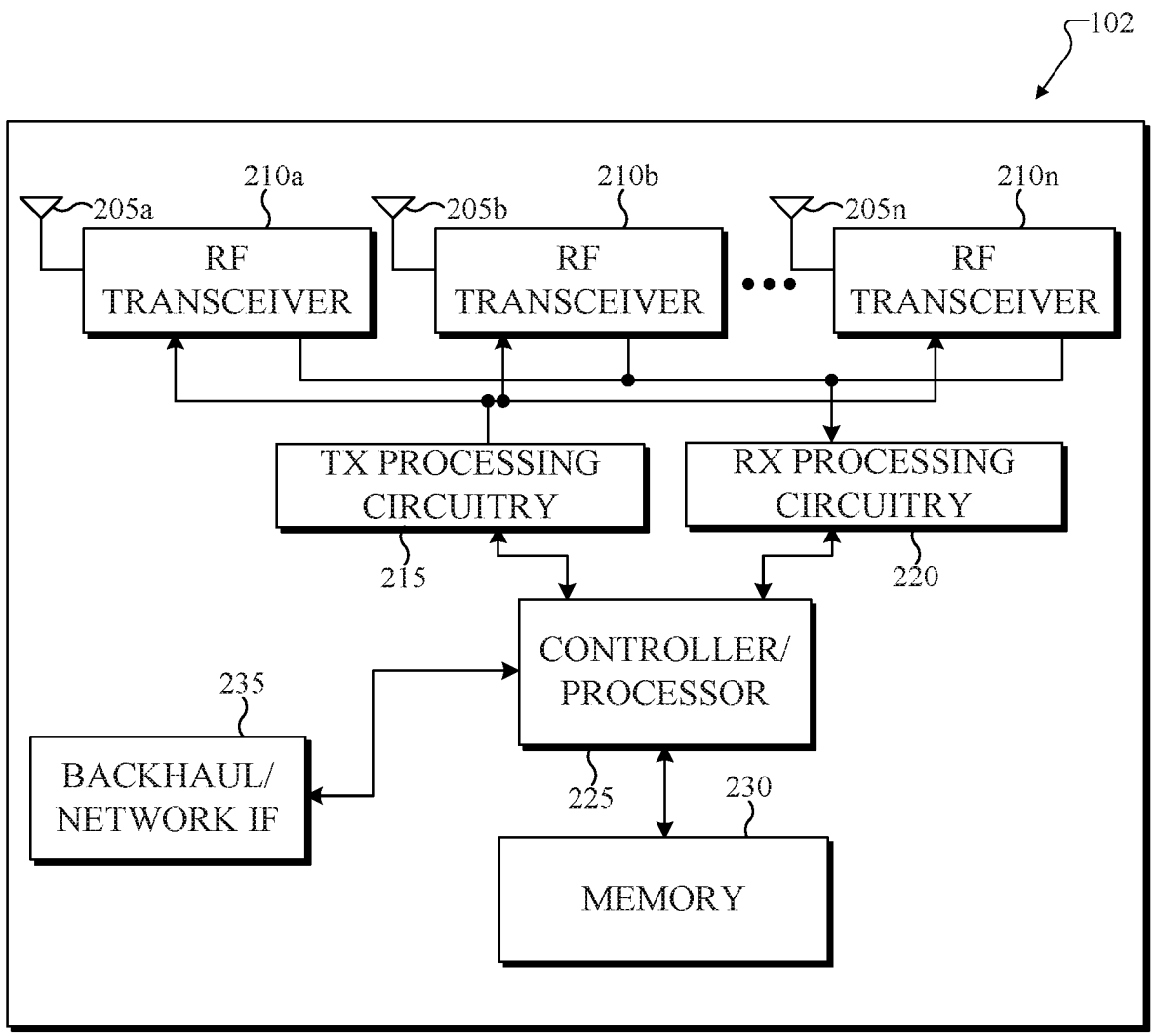
FIG. 2 illustrates an example BS according to embodiments of the present disclosure.
Figure 3:
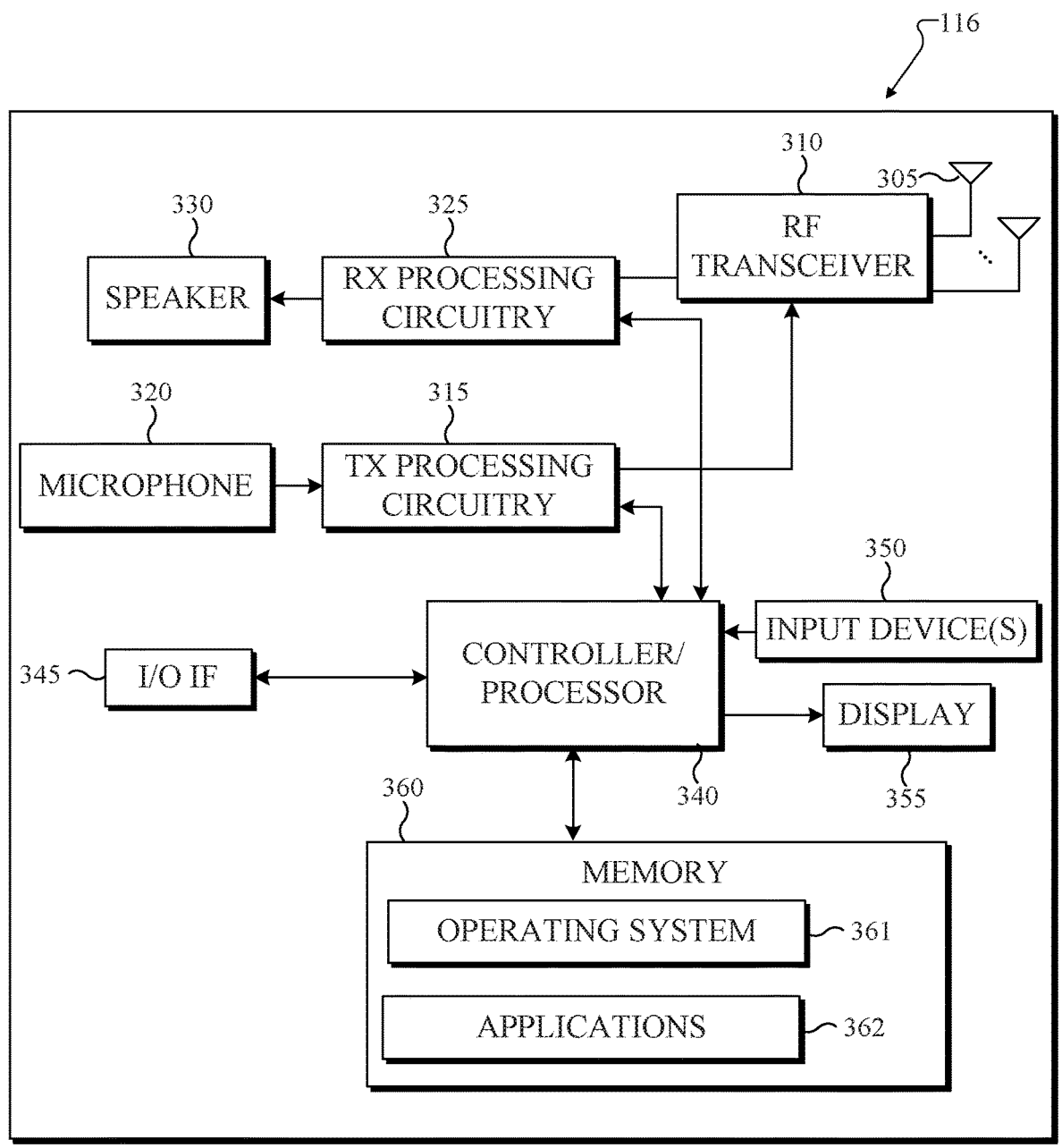
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programming, or a combination thereof for multiplexing control or data information with different priority values in a PUSCH as well as multiplexing control information with different priority values in a PUCCH. In certain embodiments, and one or more of the BSs 101-103 includes circuitry, programming, or a combination thereof for de-multiplexing control or data information with different priority values in a PUSCH as well as de-multiplexing control information with different priority values in a PUCCH.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similar, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support de-multiplexing control or data information with different priority values in a PUSCH as well as de-multiplexing control information with different priority values in a PUCCH. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305. For instance, the controller/processor 340 could support multiplexing control or data information with different priority values in a PUSCH as well as multiplexing control information with different priority values in a PUCCH.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
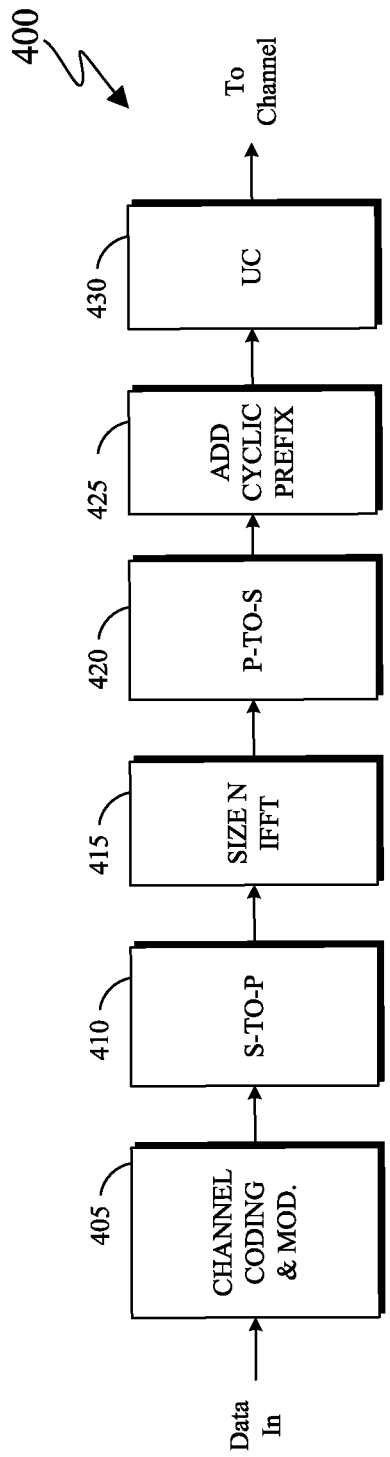
FIGS. 4 and 5 illustrate example wireless transmit and receive paths according to embodiments of the present disclosure.
Figure 5:
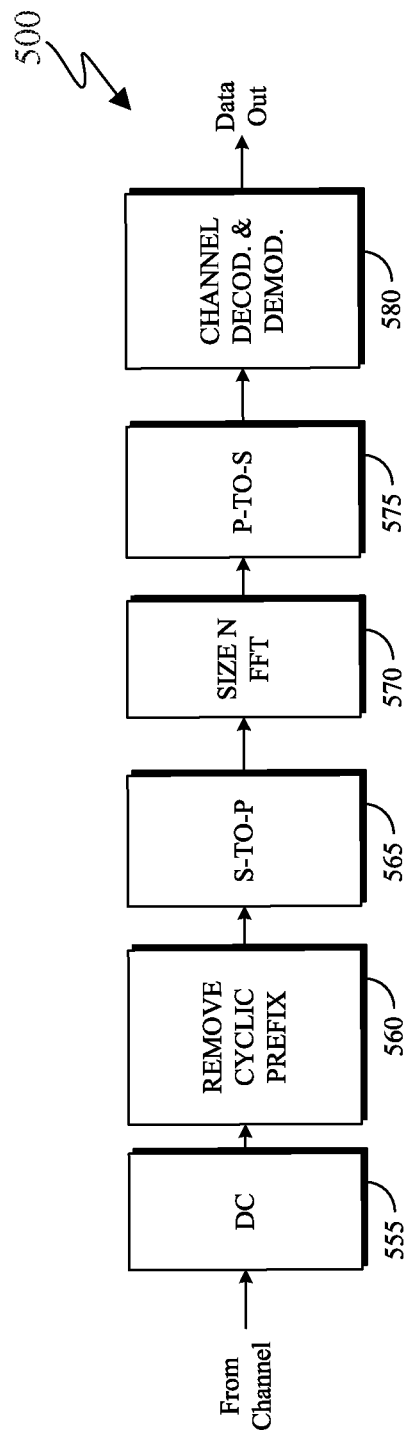

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support multiplexing control or data information with different priority values in a PUSCH as well as multiplexing control information with different priority values in a PUCCH as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding or polar coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similar, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for downlink (DL) signaling or for uplink (UL) signaling on a cell is referred to as a slot and can include one or more symbols such as 14 symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^{\mu} \cdot 15$ kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective physical DL shared channels (PDSCHs) or physical DL control channels (PDCCHs). A PDSCH or a PDCCH can be transmitted over a variable number of symbols in a slot including one symbol. A BS transmits one or more of multiple types of RS including channel state information RS (CSI-RS) and demodulation RS (DM-RS). A CSI-RS is intended for UEs (such as the UE 116) to perform measurements and provide channel state information (CSI) to a BS. For channel measurement or for time tracking, non-zero power CSI-RS (NZP CSI-RS) resources can be used. For interference measurement reports (IMRs), CSI interference measurement (CSI-IM) can be are used. The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a BS. A DM-RS is typically transmitted only within a BW of a respective PDCCH or PDSCH and a UE can use the DM-RS to demodulate data or control information.

UL signals also include data signals conveying information content, control signals conveying UL control information (UCI), DM-RS associated with data or UCI demodulation, phase tracking RS (PT-RS) enabling phase tracking for data or UCI symbols, sounding RS (SRS) enabling a BS to perform UL channel measurement, and a random access (RA) preamble enabling a UE (such as the UE 116) to perform random access. A UE transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI can include hybrid automatic repeat request acknowledgement (HARQ-ACK) information, indicating correct or incorrect detection of data transport blocks (TB s) or of code block groups (CBGs) in PDSCHs, scheduling request (SR) indicating whether a UE has data in its buffer to transmit, and CSI reports enabling a BS to select appropriate parameters for PDSCH or PDCCH transmissions to a UE. A CSI report can include a channel quality indicator (CQI) informing a BS of a largest modulation and coding scheme (MCS) for the UE to detect a data TB with a predetermined block error rate (BLER), such as a 10% BLER, of a precoding matrix indicator (PMI) informing a BS how to combine signals from multiple transmitter antennas in accordance with a multiple input multiple output (MIMO) transmission principle, of a CSI-RS resource indicator (CRI) used to obtain the CSI report, and of a rank indicator (RI) indicating a transmission rank for a PDSCH.

In certain embodiments, UL RS includes DM-RS, PT-RS, and SRS. DM-RS is typically transmitted within a BW of a respective PUSCH or PUCCH. A BS can use a DM-RS to demodulate information in a respective PUSCH or PUCCH. A UE can use a PT-RS to track a phase of a received signal, particularly for operation in a frequency range above 6 GHz. SRS is transmitted by a UE to provide a BS with an UL CSI and, for a time division duplexing (TDD) system, to also provide a PMI for DL transmission. Further, as part of a random access procedure or for other purposes, a UE can transmit a physical random access channel (PRACH).

In certain embodiments, a UE generates HARQ-ACK information in response to reception of TB s/CBGs in PDSCHs, in response to a detection of a DCI format indicating release of a semi-persistently scheduled PDSCH, in response to a detection of a DCI format indicating a change of an active bandwidth part (BWP) to a dormant BWP or to a non-dormant BWP for secondary cells, and so on as described in REF 3. For brevity, reasons for a UE to generate HARQ-ACK information will generally not be mentioned in the following and, when needed, only PDSCH receptions will be referred to.

DL transmissions and UL transmissions can be based on an orthogonal frequency division multiplexing (OFDM) waveform including a variant using DFT precoding that is known as DFT-spread-OFDM.

FIG. 6 illustrates a block diagram 600 of an example transmitter structure using orthogonal frequency division multiplexing (OFDM) according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 600 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630 and modulated by modulator 640. Subsequently, modulated encoded symbols and DM-RS or CSI-RS 650 are mapped to SCs 660 by BW selector unit 665, an inverse fast Fourier transform (IFFT) is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast Fourier transform (FFT), SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

For HARQ-ACK multiplexing on PUSCH that includes a TB, a number of coded modulation symbols per layer for HARQ-ACK, denoted as $Q'_{ACK}$, is determined as illustrated in Equation (1).

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil \right\} \quad (1)$$

In Equation (1), $O_{ACK}$ is the number of HARQ-ACK information bits. If $O_{ACK} \geq 360$, then $L_{ACK}=11$; otherwise, $L_{ACK}$ is the number of cyclic redundancy check (CRC) bits for HARQ-ACK information bits. Also, in Equation (1), $\beta_{offset}^{PUSCH} = \beta_{offset}^{HARQ-ACK}$ is provided by higher layers or indicated by a DCI format scheduling the PUSCH transmission from a set of values provided by higher layers. Additionally, $C_{UL-SCH}$ is the number of code blocks for the TB of the PUSCH transmission, and $K_r$ is the size of the r-th code block. $M_{sc}^{PUSCH}$ is the scheduled bandwidth of the PUSCH transmission, expressed as a number of subcarriers. $M_{sc}^{PTRS}(l)$ is the number of subcarriers in OFDM symbol l that carries PT-RS in the PUSCH transmission. In Equation (1), $M_{sc}^{UCI}(l)$ in the number of resource elements that can be used for transmission of UCI in OFDM symbol l, for l=0, 1, 2, ..., $N_{symb,all}^{PUSCH}-1$, in the PUSCH transmission and $N_{symb,all}^{PUSCH}$ is the total number of OFDM symbols of the PUSCH, including all OFDM symbols used for DM-RS. It is noted that for any OFDM symbol that carries DM-RS of the PUSCH, $M_{sc}^{UCI}(l)=0$ and for any OFDM symbol that does not carry DM-RS of the PUSCH, $M_{sc}^{UCI}(l)= M_{sc}^{PUSCH}-M_{sc}^{PTRS}(l)$. Additionally, the scaling factor α is configured by higher layers and $l_0$ is the symbol index of the first OFDM symbol that does not carry DM-RS, after the first DM-RS symbol(s), in the PUSCH transmission.

For CSI part 1 multiplexing on PUSCH that includes a TB, a number of coded modulation symbols per layer for CSI part 1, denoted as $Q_{CSI,1}'$, is illustrated as in Equation (2).

$$Q'_{CSI,1} = \min\left\{ \left\lceil \frac{(O_{CSI,1} + L_{CSI,1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \qquad (2)$$
$$\left. \left[\alpha \cdot \sum_{l=0}^{N_{symb,all}^{PUSCH}-1} M_{sc}^{UCI}(l)\right] - Q'_{ACK} \right\}$$

In Equation (2), $O_{CSI,1}$ is the number of bits for CSI part 1. If $O_{CSI,1} \geq 360$, then $L_{CSI,1}=11$; otherwise, $L_{CSI,1}$ is the number of CRC bits for CSI part 1. Additionally, $\beta_{offset}^{PUSCH} = \beta_{offset}^{CSI-part1}$ is provided by higher layers or indicated by a DCI format scheduling the PUSCH transmission from a set of values provided by higher layers. In Equation (2), $Q_{ACK}'$ is the number of coded modulation symbols per layer for HARQ-ACK multiplexed on the PUSCH if number of HARQ-ACK information bits is more than 2, and $$Q'_{ACK} = \sum_{l=0}^{N_{symb,all}^{PUSCH}-1} \overline{M}_{sc,rvd}^{ACK}(l)$$

if the number of HARQ-ACK information bits is no more than 2 bits, where $\overline{M}_{sc,rvd}^{ACK}(l)$ is the number of reserved resource elements for potential HARQ-ACK multiplexing in OFDM symbol l, for l=0, 1, 2, ..., $N_{symb,all}^{PUSCH}-1$, in the PUSCH transmission.

For CSI part 2 transmission on PUSCH not using repetition type B with UL-SCH, the number of coded modulation symbols per layer for CSI part 2 multiplexing, denoted as $Q_{CSI,2}'$, is illustrated in Equation (3).

$$Q'_{CSI,2} = \min\left\{ \left\lceil \frac{(O_{CSI,2} + L_{CSI,2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \qquad (3)$$
$$\left. \left[\alpha \cdot \sum_{l=0}^{N_{symb,all}^{PUSCH}-1} M_{sc}^{UCI}(l)\right] - Q'_{ACK} - Q'_{CSI-1} \right\}$$

In Equation (3), $O_{CSI,2}$ is the number of bits for CSI part 2. If $O_{CSI,2} \geq 360$ then $L_{CSI,2}=11$; otherwise, $L_{CSI,2}$ is the number of CRC bits for CSI part 2. Additionally, in Equation (3), $\beta_{offset}^{PUSCH} = \beta_{offset}^{CSI-part2}$.

Additional aspects regarding a determination of coded modulation symbols for HARQ-ACK information, CSI part 1, and CSI part 2 in a PUSCH, including when the PUSCH does not include any TB are described in REF 2 and REF 3.

5G can support multiple service types, for a same UE or for different UEs, that require BLER targets for TBs or for UCI types, or require scheduling latencies, that can differ by several orders of magnitude. Such service types are typically associated with different priority values. A UE can identify a priority value for a PDSCH reception or PUSCH/PUCCH transmission. For example, when a PDSCH reception by or PUSCH/PUCCH transmission from a UE is scheduled by a DCI format, a priority indicator field in a DCI format can be used to indicate a corresponding priority value. When a PDSCH reception by or a PUSCH/PUCCH transmission from a UE is configured by higher layers, the configuration can include a corresponding priority value.

When a UE supports transmissions/receptions with different priorities, the UE may have to simultaneously transmit a first PUSCH or a first PUCCH having a first priority type and a second PUSCH or a second PUCCH having a second priority type. A priority type of a PUCCH or PUSCH transmission is equivalent with a priority value for TBs or UCI types that are multiplexed in the PUCCH or PUSCH transmission. In such case, the UE can transmit the PUCCH or PUSCH having the larger priority value and drop transmission of the PUCCH or PUSCH having the smaller priority value.

A UE that supports PUCCH or PUSCH transmissions having multiple priority values should determine a first set of parameters for a PUCCH or PUSCH transmission with a first priority value and be able to differentiate the first set of parameters from a second set of parameters for a PUCCH or PUSCH transmission with a second priority value.

For overlapping PUCCH or PUSCH transmissions from a UE, the UE first resolves an overlapping among PUCCH or PUSCH transmissions with a priority value to obtain a single PUCCH or PUSCH where all corresponding UCI for the priority value is multiplexed, when possible. Subsequently, the UE resolves an overlapping among PUCCH or PUSCH transmissions with different priorities. The UE drops an overlapping PUCCH or PUSCH transmission having a first (smaller) priority value. Resolution of overlapping among PUCCH or PUSCH transmissions is subject to processing timelines as described in REF 3.

To avoid a spectral efficiency loss that can result from dropped transmissions, such as a dropped PUCCH transmission with HARQ-ACK information for multiple PDSCH receptions that would require retransmission by a BS of the associated PDCCHs and PDSCHs, the UE can also multiplex the UCI of smaller priority in a PUCCH or PUSCH transmission of larger priority. However, as UCI with smaller priority and larger priority typically require different BLER or different latency targets, multiplexing cannot be same as multiplexing of UCI in a PUSCH with a TB having a same priority value or in a PUCCH with other UCI having a same priority value. Further, the multiplexing can depend on whether UCI of smaller priority value is multiplexed with a TB of larger priority value in a PUSCH of corresponding larger priority or with UCI of larger priority in a PUSCH or PUCCH of corresponding larger priority, or whether UCI of larger priority value is multiplexed with a TB of smaller priority value in a PUSCH of corresponding smaller priority or with UCI of smaller priority in a PUSCH or PUCCH of corresponding smaller priority. Therefore, procedures and conditions need to be determined for such multiplexing.

Embodiments of the present disclosure take into consideration that after a UE multiplexes UCI having a larger priority value, a sufficient number of REs should remain available for multiplexing UCI with a smaller priority value. A total number of REs available for UCI multiplexing in a PUSCH should therefore depend on whether UCI of one priority or UCI of multiple priorities is multiplexed in the PUSCH and, for the former case, on the UCI priority.

A UE does not multiplex information for a scheduling request (SR) in a PUSCH transmission because, when the UE has a positive SR to indicate presence of data information/UL-SCH for transmission in the UE buffer, the UE can instead multiplex a buffer status report (BSR) through a MAC control element (CE) in the PUSCH. However, when the UE supports UL-SCH of multiple priority values, such as two priority values, a BSR can only indicate existence in the UE buffer of data information for transmission, wherein the data information (UL-SCH) has a same priority value as the PUSCH transmission (UL-SCH in the PUSCH transmission). The UE cannot provide a BSR or SR when the UE transmits a PUSCH that does not include an UL-SCH, which can be problematic in cases of UL-SCH with low latency requirements.

Therefore, embodiments of the present disclosure take into consideration that there is a need to determine a procedure for a UE to identify a set of parameters for a PUCCH or a PUSCH transmission with a corresponding priority value. Embodiments of the present disclosure also take into consideration that there is another need to determine a procedure for a UE to multiplex UCI and TBs or UCI with different priority values in a PUSCH transmission while achieving latency requirements for the UCI or TB with different priority values. Embodiments of the present disclosure further take into consideration that there is another need to determine a procedure for a UE to multiplex UCI and TB s or UCI with different priority values in a PUSCH transmission while achieving BLER requirements for the UCI or TB with different priority values. Additionally, embodiments of the present disclosure take into consideration that there is another need to determine a number of available REs for UCI multiplexing in a PUSCH depending on the number of UCI priority values and on the UCI priority values. Embodiments of the present disclosure take also into consideration that there is another need for a UE to provide BSR for data information with multiple priority values or to multiplex SR in a PUSCH transmission.

Accordingly, embodiments of the present disclosure relate to a procedure for a UE to identify a set of parameters for a PUCCH or a PUSCH transmission with a corresponding priority value. The present disclosure also relates to determining a procedure for a UE to multiplex UCI and TBs or UCI with different priority values in a PUSCH transmission while achieving latency requirements for the UCI or TB with different priority values. The present disclosure further relates to determining a procedure for a UE to multiplex UCI and TB s or UCI with different priority values in a PUSCH transmission while achieving BLER requirements for the UCI or TB with different priority values. Additionally, the present disclosure relates to determining a number of available REs for UCI multiplexing in a PUSCH depending on the number of UCI priority values and on the UCI priority values. The present disclosure also relates to providing BSR for data with multiple priority values or to multiplex SR in a PUSCH transmission.

In certain embodiments, a UE multiplexes UCI in a PUCCH transmission using different PUCCH formats. It is noted that, a selection of a PUCCH format depends on a UCI payload and a latency target. For UCI payloads of up to 2 bits that are applicable for HARQ-ACK information or SR, a PUCCH format 0 or a PUCCH format 1 can be used, where a PUCCH transmission duration for the former is 1 or 2 symbols and a PUCCH transmission duration for the latter is 4 to 14 symbols. For UCI payloads of more than 2 bits, a PUCCH format 2, or a PUCCH format 3, or a PUCCH format 4 can be used, where a PUCCH transmission duration for the first is 1 or 2 symbols and a PUCCH transmission duration for the last two is 4 to 14 symbols.

For multiplexing HARQ-ACK information in a PUCCH transmission, in response to a PDSCH reception scheduled by a DCI format, the UE (such as the UE 116) can determine a PUCCH resource, from a set of PUCCH resources, that is indicated by a PUCCH resource indicator (PRI) field in the DCI format. The UE can additionally multiplex SR or CSI in the PUCCH transmission. The UE can then select a PUCCH resource with the smaller number of RBs that results to a code rate for the UCI multiplexing in the PUCCH that is smaller than a code rate the UE provided by higher layers from a serving BS.

Embodiments of the present disclosure take into consideration that after a UE multiplexes UCI and TB or UCI in a PUCCH or PUSCH transmission, the UE determines a power, and a priority for allocation of the power, for the PUCCH or PUSCH transmission. For example, a maximum PUCCH or PUSCH transmission power can be up to a UE configured maximum output power.

In certain embodiments, when a PUSCH transmission power is smaller than the UE configured maximum output power, and in units of decibel per milliWatt (dBm), the PUSCH transmission power increases by a factor of:

$$\Delta_{TF}=10 \log 10((2^{K_s \cdot BPRE}-1)\cdot\beta_{offset}^{PUSCH}) \qquad (4)$$

where BPRE indicates a spectral efficiency (number of bits per RE). For PUSCH with UL-SCH data, BPRE is defined in Equation (5). For PUSCH without UL-SCH data, BPRE is defined in Equation (6).

$$BPRE = \sum_{r=0}^{C_{UL-SCH}-1} K_r/N_{RE} \qquad (5)$$

$$BPRE = Q_m \cdot R/\beta_{offset}^{PUSCH} \qquad (6)$$

where, $N_{RE}$, of Equation (5), is further defined in Equation (7), below:

$$N_{RE} = M_{RB}^{PUSCH} \cdot \sum_{j=0}^{N_{symb}^{PUSCH}-1} N_{sc,data}^{RB}(j) \qquad (7)$$

where, $M_{RB}^{PUSCH}$ is a number of RBs for the PUSCH transmission, $N_{symb}^{PUSCH}$ is a number of symbols for the PUSCH transmission, and $N_{sc,data}^{RB}(j)$ is a number of sub-carriers in symbol j of the PUSCH transmission excluding sub-carriers used for DM-RS and PT-RS multiplexing. In Equation (6), $Q_m$ is a modulation order and R is a target code rate provided by a DCI format scheduling the PUSCH transmission that does not include UL-SCH data and includes UCI. In Equation (4), $K_s=1.25$ or $K_s=0$ as indicated by higher layers. Additionally, in Equation (4) and Equation (6), $\beta_{offset}^{PUSCH}=1$ for PUSCH with UL-SCH data, and $\beta_{offset}^{PUSCH}=\beta_{offset}^{CSI,1}$ for PUSCH without UL-SCH data (and with UCI).

In certain embodiments, when a PUCCH transmission power is smaller than the UE configured maximum output power, and in units of decibel per milliWatt, for PUCCH formats 2, 3, and 4 and for a number of UCI bits smaller than or equal to 11, the PUCCH transmission power increases by a factor of:

$$\Delta_{TF}=10 \log 10(K_1 \cdot (n_{HARQ-ACK}+O_{SR}+O_{CSI})/N_{RE}) \quad (8)$$

where, $K_1=6$, and $n_{HARQ-ACK}$ is a number of HARQ-ACK information bits that the UE determines as a result of DCI format detection or of a TB decoding, $O_{SR}$ is a number of SR information bits, and $O_{CSI}$ is a number of CSI bits. Additionally, $N_{RE}$ of Equation (8) is further defined in Equation (9).

$$N_{RE}=M_{RB}^{PUCCH} \cdot N_{sc,ctrl}^{RB} \cdot N_{symb-UCI}^{PUCCH} \quad (9)$$

where, $M_{RB}^{PUCCH}$ is a number of RBs for the PUSCH transmission, $N_{sc,ctrl}^{RB}$ is a number of sub-carriers per RB excluding subcarriers used for DM-RS transmission, and $N_{symb-UCI}^{PUCCH}$ is a number of symbols excluding symbols used for DM-RS transmission.

In certain embodiments, when a PUCCH transmission power is smaller than the UE configured maximum output power, and in units of decibel per milliWatt, for PUCCH formats 2, 3, and 4 and for a number of UCI bits larger than 11, the PUCCH transmission power increases by a factor of:

$$\Delta_{TF}=10 \log 10((2^{K_2 \cdot BPRE}-1)) \quad (10)$$

where, $K_2=2.4$ and BPRE is defined in Equation (11) below.

$$BPRE=(O_{ACK}+O_{SR}+O_{CSI}+O_{CRC})/N_{RE} \quad (11)$$

where, $O_{ACK}$ is a total number of HARQ-ACK information bits in the PUCCH and $O_{CRC}$ is a number of CRC bits.

In certain embodiments, when a UE multiplexes UCI of a first priority, such as a smaller priority, in a PUCCH or a PUSCH transmission of a second priority, such as a larger priority, the UE needs to determine a transmission power for the PUCCH or PUSCH transmission that includes a first UCI and a TB or a second UCI of different priorities. Using a same transmission power as without multiplexing can result to an under-dimensioning of the transmission power and consequently to a reduced reception reliability.

Therefore, embodiments of the present disclosure take into consideration that there is a need to determine a procedure for a UE to multiplex UCI with different priority values in a PUCCH transmission while achieving latency requirements for the UCI with the different priority values. Embodiments of the present disclosure also take into consideration that there is another need to determine a procedure for a UE to multiplex UCI with different priority values in a PUCCH transmission while achieving BLER requirements for the UCI with the different priority values. Additionally, embodiments of the present disclosure take into consideration that there is another need to determine a power for a PUCCH transmission that includes UCI with different priority values. Embodiments of the present disclosure take also into consideration that there is another need to determine a number of RBs for a PUCCH transmission that includes UCI with different priority values.

Accordingly, embodiments of the present disclosure relate to determining a procedure for a UE to multiplex UCI with different priority values in a PUCCH transmission while achieving latency requirements for the UCI with the different priority values. The present disclosure also relates to determining a procedure for a UE to multiplex UCI with different priority values in a PUCCH transmission while achieving BLER requirements for the UCI with the different priority values. The present disclosure further relates to determining a power for a PUCCH transmission that includes UCI with different priority values. Additionally, the present disclosure relates to determining a number of RBs for a PUCCH transmission that includes UCI with different priority values.

As used below, when referring to first UCI, first TB, first PUCCH, or first PUSCH, unless otherwise explicitly noted, reference is to a UCI, TB, PUCCH, PUSCH having a first priority value. A same corresponding reference applies when referring to second UCI, second TB, second PUCCH, second PUSCH. The first priority value is smaller than the second priority value.

Embodiments of the present disclosure relate to a UE determining a set of parameters for a PUSCH or a PUCCH transmission. The following examples and embodiments, such as those described in FIG. 8, describe procedures for determining a set of parameters for a PUSCH or a PUCCH transmission.

Figure 8:
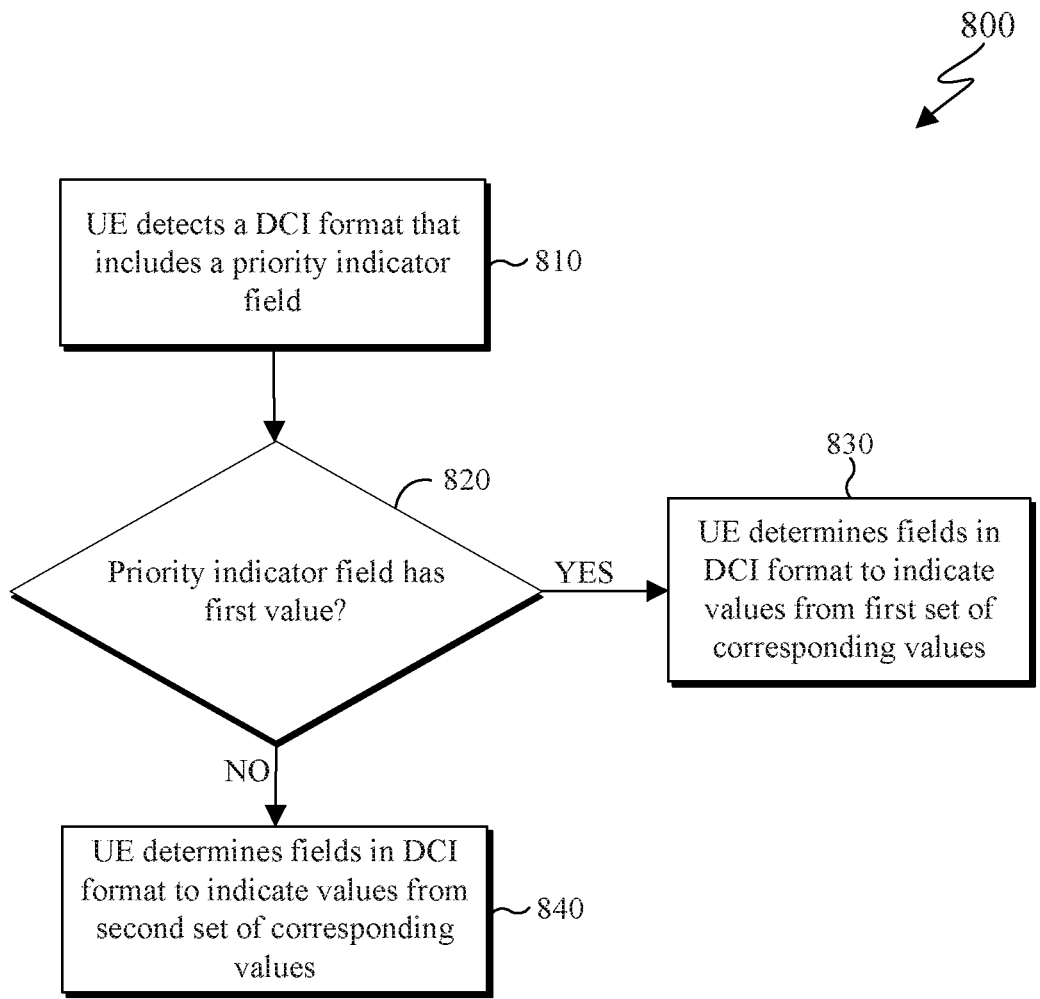
FIG. 8 illustrates an example method for a UE to determine parameters for either a PUCCH transmission or a PUSCH transmission according to embodiments of the present disclosure.

FIG. 8 illustrates an example method 800 for a UE to determine parameters for either a PUCCH transmission or a PUSCH transmission according to embodiments of the present disclosure. The steps of the method 800 can be performed by any of the UEs 111-116 of FIG. 1, such as the UE 116 of FIG. 3. The method 800 of FIG. 8 is for illustration only and other embodiments can be used without departing from the scope of the present disclosure.

An embodiment of the present disclosure describes a procedure for a UE to determine a set of parameters, from multiple sets of parameters. The parameters are for UCI multiplexing in a PUSCH or in a PUCCH. The set of parameters are also for the transmission of the PUSCH or the PUCCH when UCI types or TBs have multiple priority values. In the following, two sets of parameters and two priority values are considered for brevity, but the embodiment can be extended to an arbitrary number of sets of parameters and an arbitrary number of corresponding priority values.

In certain embodiments, when a UE is configured to support PUCCH or PUSCH transmissions with multiple priority values, the UE determines a set of parameters for UCI multiplexing in a PUCCH or a PUSCH transmission and a set of parameters for the PUCCH or the PUSCH transmission.

For example, the UE can be provided two configurations of PUCCH parameters (per BWP) for determining how to multiplex UCI in a PUCCH and how to transmit the PUCCH according to a first or a second priority value. The PUCCH transmission parameters that can be associated with different priority values include at least one or more of the following: (i) dl-DataToUL-ACK, (ii) pucch-PowerControl, (iii) format0, format1, format2, format3, and format4, (iv) nrof-PRBs, (v) maxCodeRate, and (vi) simultaneousHARQ-ACK-CSI.

A configuration for a PUCCH transmission parameter dl-DataToUL-ACK provides a list of values for a timing unit, such as a slot that can have different durations (number of symbols) for different priority values. With reference to slots of a PUCCH transmission and for a value k, HARQ-ACK information that a UE generates in response to a PDSCH reception in slot n is multiplexed in a PUCCH (or PUSCH) transmission in slot n+k where the value of k, from the list of values provided by dl-DataToUL-ACK, is indicated by a field in a DCI format or is provided by higher layers.

A configuration for a PUCCH transmission parameter pucch-PowerControl provides a set of parameters for determining a PUCCH transmission power.

A configuration for a PUCCH transmission parameter format0, format1, format2, format3, or format4, provides parameters associated with transmission of a PUCCH using PUCCH format 0, PUCCH format 1, PUCCH format 2, PUCCH format 3, and PUCCH format 4 such as a number of symbols, a first symbol in a slot and, when applicable, a number of RBs.

A configuration for a PUCCH transmission parameter nrofPRBs provides a maximum number of RBs available for a PUCCH transmission, when applicable.

A configuration for a PUCCH transmission parameter maxCodeRate provides a maximum code rate that can be used to determining a number of RBs and a number of bits for UCI multiplexing for a PUCCH transmission, when applicable.

A configuration for a PUCCH transmission parameter simultaneousHARQ-ACK-CSI enables multiplexing of CSI with HARQ-ACK information in a PUCCH transmission.

PUCCH transmission parameters can also be common for PUCCH transmissions associated with first and second priority values. For example, a parameter indicating a spatial relation between a reference RS, such as a synchronization signal (SS) physical broadcast channel (PBCH) block (SS/PBCH block), or a CSI-RS, or a SRS, and a PUCCH can have a same value for PUCCH transmissions having first and second priority values. Therefore, a set of values for priority-common parameters can be provided once in a common configuration and sets of values for priority-specific parameters can be provided separately per priority. As a number of priority-common parameters is generally much smaller than a number of priority-specific parameters, it is also possible that separate sets of values are provided for each corresponding priority value for all parameters associated with PUCCH transmissions. Despite a possible unnecessary duplication of few parameter values, the latter approach can be preferable when simplification of higher layer signaling procedures is preferable.

In certain embodiments, a UE can be provided with two configurations of PUSCH parameters (per BWP) for determining (i) how to multiplex UCI or a TB in a PUSCH and (ii) how to transmit the PUCCH according to a first or a second priority value. PUSCH transmission parameters that can be associated with different priority values include at least one or more of the following (i) UCI-OnPUSCH, (ii) mcs-Table, (iii) pusch-PowerControl, (iv) pusch-TimeDomainAllocationList, (v) maxRank.

A configuration for a PUSCH transmission parameter OnPUSCH provides a list of values corresponding to entries in tables providing $\beta_{offset}^{PUSCH}$ values for multiplexing HARQ-ACK information, CSI part-1, and CSI part-2 in a PUSCH transmission and for a scaling value a that provides a percentage of PUSCH resources that can be used for UCI multiplexing.

A configuration for a PUSCH transmission parameter mcs-Table indicates an MCS table modulating and coding a TB in a PUSCH transmission.

A configuration for a PUSCH transmission parameter pusch-PowerControl indicates a set of power control parameters for determining a PUSCH transmission power.

A configuration for a PUCCH transmission parameter pusch-TimeDomainAllocationList indicates a time domain resource allocation (TDRA) table.

A configuration for a PUCCH transmission parameter maxRank indicates a maximum rank for a PUSCH transmission.

As illustrated in the FIG. 8, the method 800 describes a procedure for a UE (such as the UE 116) to determine parameters for a PUCCH transmission or for a PUSCH transmission based on a corresponding priority value according to this disclosure.

In step 810 the UE detects a DCI format that includes a priority indicator field. In step 820, the UE determines whether the priority indicator field has a first value or a second value. For example, the priority indicator field can include one binary element with a first value of '0' and a second value of '1'. When the UE determines that the priority indicator field has the first value (as determined in step 820), the UE, in step 830, determines that fields in the DCI format indicate values for corresponding parameters from a first set of corresponding parameter values. When the priority indicator field has the second value (as determined in step 820), the UE, in step 840, determines that fields in the DCI format indicate values for corresponding parameters from a second set of corresponding parameter values.

For example, the DCI format can also include a PDSCH-to-HARQ_feedback timing indicator field indicating a second value. In this example, the second value is the second value provided by dl-DataToUL-ACK in a first configuration of parameter values for a PUCCH transmission when the priority indicator field has the first value. Additionally, the second value is the second value provided by dl-DataToUL-ACK in a second configuration of parameter values for a PUCCH transmission when the priority indicator field has the second value.

Although FIG. 8 illustrates the method 800, various changes may be made to this FIGURE. For example, while the method 800 of FIG. 8 is shown as a series of steps, various steps could overlap, occur in parallel, occur in a different order, or occur multiple times. In another example, steps may be omitted or replaced by other steps. For example, steps of the method 800 can be executed in a different order.

Embodiments of the present disclosure also relate to a UE multiplexing UCI with different priority values in a PUSCH. The following examples and embodiments, such as those described in FIGS. 9, 10, and 11, describe procedures for multiplexing UCI with different priority values in a PUSCH.

Figure 9:
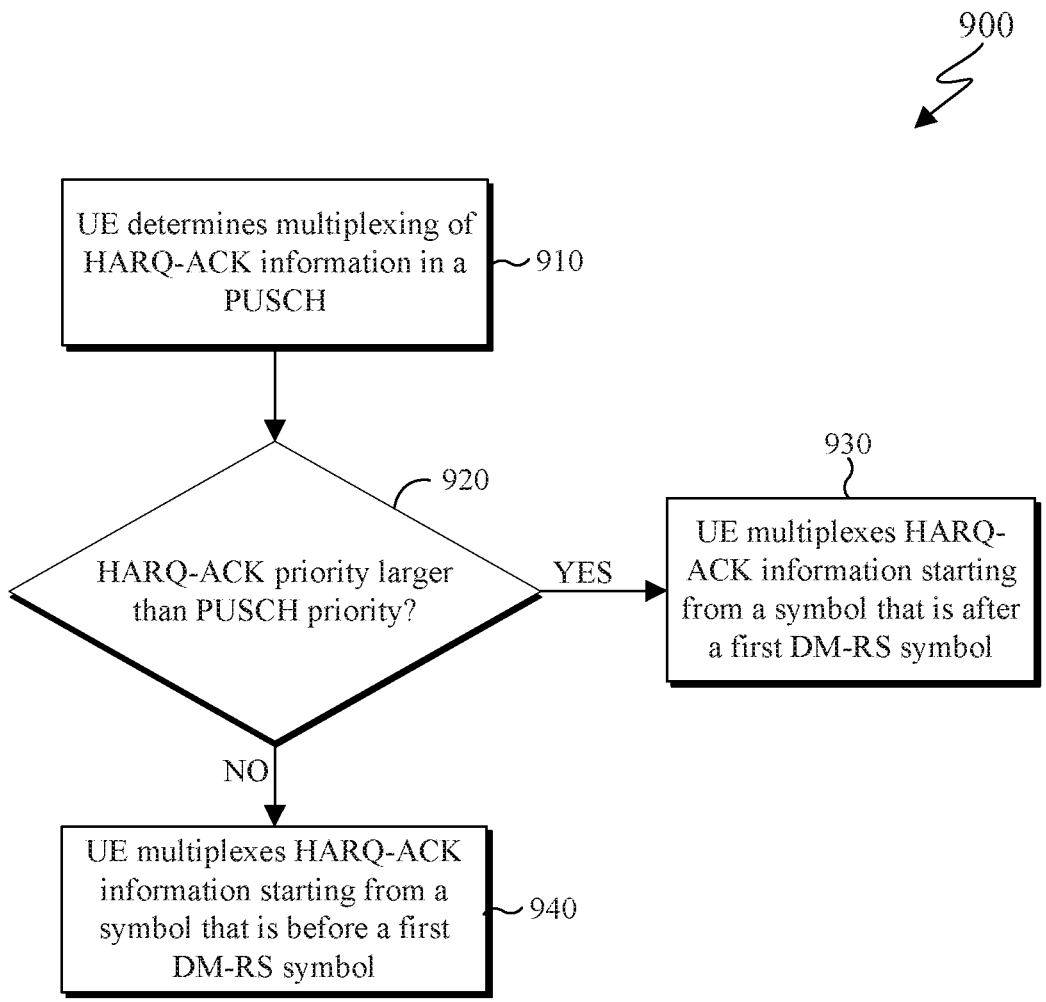
FIG. 9 illustrates an example method for a UE to multiplex unlink control information (UCI) in a PUSCH having a first priority value based on a UCI priority value according to embodiments of the present disclosure.
Figure 10:
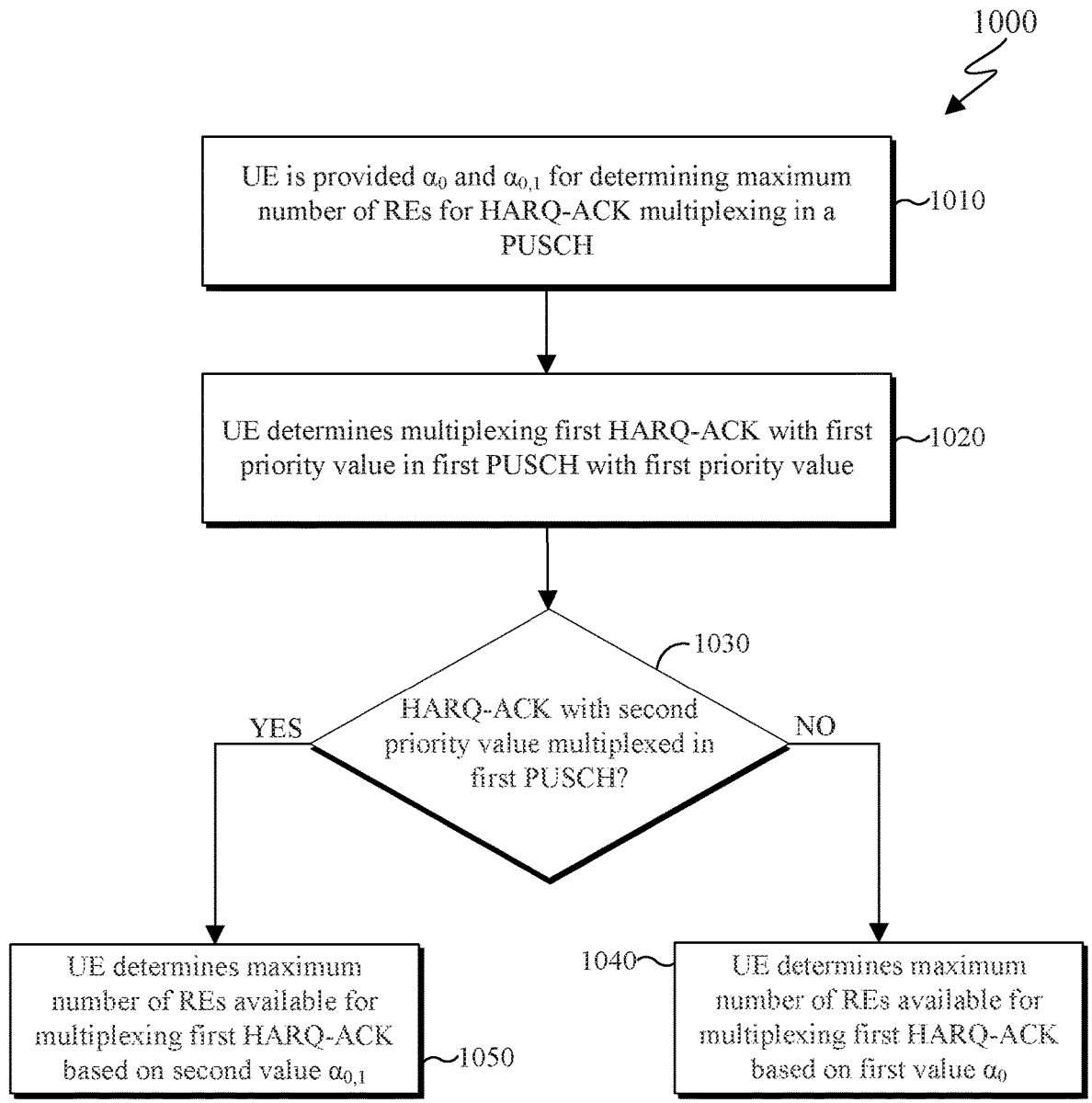
FIG. 10 illustrates an example method for a UE to determine a maximum number of available REs for multiplexing HARQ-ACK information in a PUSCH having a first priority according to embodiments of the present disclosure.
Figure 11:
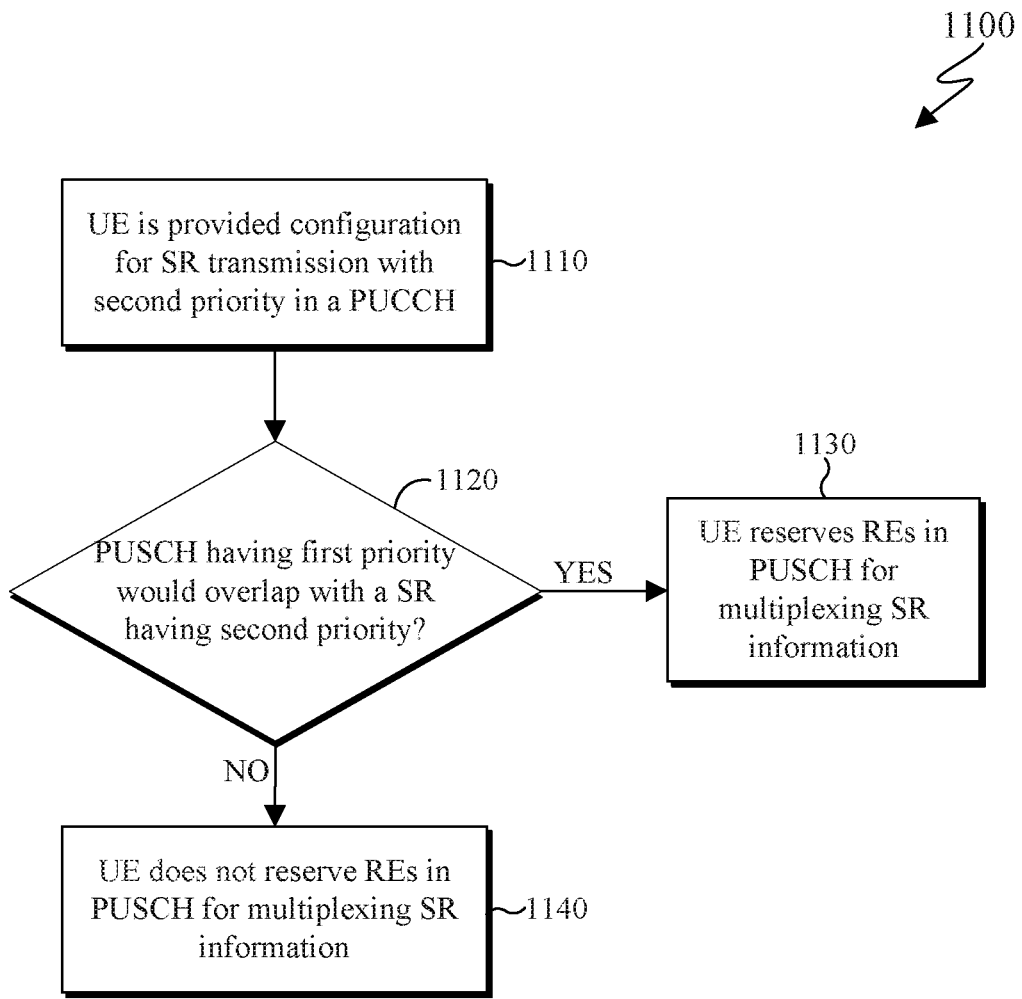
FIG. 11 illustrates an example method for a UE to multiplex scheduling request (SR) in a PUSCH transmission according to embodiments of the present disclosure.

FIG. 9 illustrates an example method 900 for a UE to multiplex UCI in a PUSCH having a first priority value based on a UCI priority value according to embodiments of the present disclosure. FIG. 10 illustrates an example method 1000 for a UE to determine a maximum number of available REs for multiplexing HARQ-ACK information in a PUSCH having a first priority according to embodiments of the present disclosure. FIG. 11 illustrates an example method 1100 for a UE to multiplex SR in a PUSCH transmission according to embodiments of the present disclosure. The steps of the methods 900-1100 can be performed by any of the UEs 111-116 of FIG. 1, such as the UE 116 of FIG. 3. The methods 900-1100 of FIGS. 9, 10, and 11 are for illustration only and other embodiments can be used without departing from the scope of the present disclosure.

An embodiment of the present disclosure describes conditions for multiplexing of UCI that the UE would transmit in a PUCCH, or of TBs and UCI in a PUSCH, wherein the UCI and the TBs have different priority values. A PUSCH that includes UCI with multiple priority values has a priority value that is equal to the largest of the UCI priority values and the TB/PUSCH priority value. In the following example, a PUSCH having a first priority value is only considered for brevity but the descriptions can be extended to a PUSCH having a second priority value and to multiplexing of UCI having a first priority value in that PUSCH.

In certain embodiments, a UE procedure for multiplexing second UCI in a first PUSCH is defined to enable latency and BLER targets for the second UCI as for when the UE does not multiplex the second UCI in the first PUSCH (second UCI is multiplexed in a second PUCCH). To achieve the latency target, the second UCI is mapped first to REs of the first PUSCH, prior to any mapping of TB s or of first UCI. A mapping is first in frequency across REs of a symbol, and then in time across symbols starting from the first symbol. For mapping of UCI in a PUSCH with same priority, a similar latency constraint exists for UCI and data information and HARQ-ACK information is mapped after a first DM-RS in a PUSCH.

In certain embodiments, HARQ-ACK information is placed between DM-RS symbols in a PUSCH to improve accuracy of a channel estimate applied to demodulation of HARQ-ACK information. However, for UEs supporting applications with multiple priorities including applications that require high reliability, a corresponding operating signal-to-interference and noise ratio (SINR) can be large enough and a Doppler shift due to UE mobility is typically low enough for a channel estimate to be accurate across all symbols of a PUSCH. To avoid a latency increase for second HARQ-ACK information, when included in the second UCI that is multiplexed in a first PUSCH, the mapping can start across REs of the first PUSCH symbol, continue across REs of the second PUSCH symbol, and so on while avoiding REs or symbols that include DM-RS REs or PT-RS REs.

As illustrated in the FIG. 9, the method 900 describes a procedure for a UE (such as the UE 116) to multiplex UCI in a PUSCH having a first priority value based on a UCI priority value.

In step 910, the UE determines multiplexing of HARQ-ACK information in a PUSCH transmission. In step 920, the UE determines whether a second priority value for the HARQ-ACK information is same as a priority value of the PUSCH transmission. When the second priority value is same as or smaller than the priority value (as determined in step 920), the UE, in step 930, multiplexes the HARQ-ACK information starting from a symbol that is after first DM-RS symbol for the PUSCH transmission. When the second priority value is larger than the priority value (as determined in step 920), the UE, in step 940, multiplexes the HARQ-ACK information starting from a symbol that is before a first DM-RS symbol for the PUSCH transmission.

It is also possible that when the second priority value is same as or smaller than the priority value, the UE multiplexes the HARQ-ACK information starting from REs of the first DM-RS symbol that are not used for DM-RS transmission.

In certain embodiments, to achieve the reliability target for the second UCI, multiplexing of the second UCI in the first PUSCH should not be subject to a limitation of REs introduced by $$\left[ \alpha \cdot \sum_{l=0}^{N_{symb,all}^{PUSCH}-1} M_{sc}^{UCI}(l) \right].$$

For that purpose, either that limitation does not exist for the second UCI or a separate value of α is provided by higher layers for multiplexing second UCI in the first PUSCH than for multiplexing first UCI in the first PUSCH. For example, for multiplexing of second HARQ-ACK information on a first PUSCH that includes a transport block, a number of coded modulation symbols per layer for the second HARQ-ACK transmission, denoted as $Q'_{ACK,1}$, is determined as in Equation (12) where $\alpha_1$ is either predetermined in the specifications of the system operation to have a value of 1, or is provided by higher layer signaling separately from a value of $\alpha_0$ that is applicable to first UCI. In addition, the value $\beta_{offset}^{PUSCH}$ is separately provided by higher layers for the second HARQ-ACK information than a value of $\beta_{offset,0}^{PUSCH}$ that is applicable for the first HARQ-ACK information. Coding for first UCI and second UCI when multiplexing is in a PUSCH can follow same procedures as when multiplexing is in a PUCCH.

$$Q'_{ACK,1} = \min \left\{ \left\lceil \frac{(O_{ACK,1} + L_{ACK,1}) \cdot \beta_{offset,1}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \tag{12}$$

$$\left. \left[ \alpha_1 \cdot \sum_{l=0}^{N_{symb,all}^{PUSCH}-1} M_{sc}^{UCI}(l) \right] \right\}$$

When both first UCI and second UCI are multiplexed in a first PUSCH, a number of REs that is available for the first UCI is reduced when the second UCI is multiplexed first in the PUSCH. For example, when the second HARQ-ACK information is not multiplexed, the number of REs that are available for multiplexing the first HARQ-ACK information in the first PUSCH is equal to:

$$\left[ \alpha_0 \cdot \sum_{l=0}^{N_{symb,all}^{PUSCH}-1} M_{sc}^{UCI}(l) \right] \tag{13}$$

Additionally, when the second HARQ-ACK information is multiplexed, the number of REs that are available for multiplexing the first HARQ-ACK information in the first PUSCH is equal to:

$$\min \left\{ \sum_{l=0}^{N_{symb,all}^{PUSCH}-1} M_{sc}^{UCI}(l) - \right. \tag{14}$$

$$\min \left\{ \left\lceil \frac{(O_{ACK,1} + L_{ACK,1}) \cdot \beta_{offset,1}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left[ \alpha_1 \cdot \sum_{l=0}^{N_{symb,all}^{PUSCH}-1} M_{sc}^{UCI}(l) \right] \right\}, \left[ \alpha_0 \cdot \sum_{l=0}^{N_{symb,all}^{PUSCH}-1} M_{sc}^{UCI}(l) \right] \right\}$$

A possible degradation in a reception reliability of TB s in the first PUSCH is preferable to a possible degradation in a reception reliability of first HARQ-ACK information/UCI in the first PUSCH when second HARQ-ACK information/UCI is multiplexed in the first PUSCH. In order to minimize or avoid a degradation in the reception reliability of first HARQ-ACK information (or UCI), a second value $\alpha_{0,1}$ can be provided to the UE by higher layers from a serving BS (such as the BS 102) for determining a number of available REs for multiplexing first UCI after multiplexing second UCI, such as second HARQ-ACK information, in a first PUSCH. For example, the UE can expect that $\alpha_{0,1} > \alpha_0$. Then, for example, for multiplexing first HARQ-ACK information in a first PUSCH that includes a transport block, a number of coded modulation symbols per layer for the first HARQ-ACK transmission, $Q_{ACK,0,1}'$, is as provided in Equation (15).

$$Q'_{ACK,0,1} = \min\left\{\left\lceil\frac{(O_{ACK,0} + L_{ACK,0}) \cdot \beta_{offset,0}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left[\alpha_{0,1} \cdot \sum_{l=0}^{N_{symb,all}^{PUSCH}-1} M_{sc}^{UCI}(l)\right] -$$

$$\min\left\{\left\lceil\frac{(O_{ACK,1} + L_{ACK,1}) \cdot \beta_{offset,1}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left.\left[\alpha_1 \cdot \sum_{l=0}^{N_{symb,all}^{PUSCH}-1} M_{sc}^{UCI}(l)\right]\right\}\right\}$$

As illustrated in the FIG. 10, the method 1000 describes a procedure for a UE (such as the UE 116) to determine a maximum number of available REs for multiplexing HARQ-ACK information in a PUSCH having a first priority based on whether or not the UE multiplexes in the PUSCH HARQ-ACK information having a second priority.

In step 1010, the UE is provided by higher layers a first value $\alpha_0$ and a second value $\alpha_{0,1}$ for determining a maximum number of REs for multiplexing first HARQ-ACK information or, in general UCI, having a first priority value in a PUSCH transmission having the first priority value. In step 1020, the UE determines multiplexing of the first HARQ-ACK information in the first PUSCH.

In step 1030, the UE determines whether second HARQ-ACK information having a second priority value, larger than the first priority value, is also multiplexed in the first PUSCH. When the second HARQ-ACK information is not multiplexed in the first PUSCH (as determined in step 1030), the UE, in step 1040, determines a maximum number of REs available for multiplexing the first HARQ-ACK info nation based on the first value $\alpha_0$. Alternatively, when the second HARQ-ACK information is multiplexed in the first PUSCH (as determined in step 103) the UE, in step 1050, determines a maximum number of REs available for multiplexing the first HARQ-ACK information based on the second value $\alpha_{0,1}$.

In certain embodiments, it is possible for a serving BS (such as the BS 102) to indicate through a DCI format scheduling the first PUSCH transmission a value of a. For example, a UE (such as the UE 116) can be provided by higher layers 2 or 4 values of a and the serving BS can indicate one of the 2 or 4 values using a scaling field of 1 or 2 bits, respectively, in the DCI format.

In a first approach for enabling a UE to indicate existence of data information with multiple priority values for transmission, a MAC CE can be enhanced to include a BSR for each UL-SCH priority value that the UE supports. For example, when the UE supports UL-SCH with first and second priority values, a BSR in a MAC CE can include one or both of a first BSR and a second BSR.

In a second approach for enabling a UE to indicate existence of data information with multiple priority values for transmission, a SR having a first or second priority value can be multiplexed in a PUSCH having a second or first priority value, respectively. Further a SR having a first or second priority value can be multiplexed in a PUSCH transmission without an UL-SCH having a first or second priority value, respectively. It is also possible for a SR of any priority value to be multiplexed in a PUSCH of any priority value. For multiplexing a SR in a PUSCH transmission, the UE assumes that a number of REs are reserved, similar to reserving a number of REs for multiplexing HARQ-ACK information of 1-2 bits, whenever the PUSCH transmission overlaps with a SR transmission occasion in a PUCCH as determined by the configuration for the SR transmission that includes, for example, a periodicity and an offset in number of slots for the corresponding priority value. The UE can be separately provided $\beta_{offset}^{PUSCH}$ values for combinations of multiplexing SR having a first or second priority value in a PUSCH having a second or first priority value, or same values as for HARQ-ACK information having corresponding priority values can apply. The first and second approaches can be combined by using the first approach when the PUSCH transmission includes an UL-SCH and using the second approach when the PUSCH transmission does not include an UL-SCH.

In certain embodiments, when the UE multiplexes HARQ-ACK information in the PUSCH transmission, the UE can jointly code the HARQ-ACK information bits and the SR bits and not use the reserved resources for multiplexing SR in the PUSCH transmission. The reserved resources are then available for UCI or data multiplexing. The payload of the jointly coded HARQ-ACK information bits $O_{ACK}$ and SR bits $O_{SR}$ is $O_{ACK}+O_{SR}$ and includes CRC bits when $O_{ACK}+O_{SR}>11$ bits.

As illustrated in the FIG. 11, the method 1100 describes a procedure for a UE (such as the UE 116) to multiplex SR in a PUSCH transmission.

In step 1110, the UE is provided by higher layers a configuration for SR multiplexing in a PUCCH, where the SR has a second priority value. The configuration can include a periodicity and an offset in slots and can also include a slot duration. In step 1120, the determines whether or not a PUSCH transmission having a first priority value would overlap with a PUCCH transmission occasion with SR having a second priority value. When the PUSCH transmission would overlap with the PUCCH transmission occasion with SR (as determined in step 1120), the UE, in step 1130, reserves REs in the PUSCH for multiplexing SR information. The UE determines the number of REs to reserve based on a $\beta_{offset}^{PUSCH}$ value that the UE is provided for multiplexing SR with a priority value in a PUSCH with a priority value. For example, the UE can be provided up to 4 $\beta_{offset}^{PUSCH}$ values for multiplexing SR having a first priority value in a PUSCH having a first or second priority value, $\beta_{offset,0}^{PUSCH}$ or $\beta_{offset,0}^{PUSCH}$ respectively, and for multiplexing SR having a second priority value in a PUSCH having a first or second priority value, $\beta_{offset,1,0}^{PUSCH}$ or $\beta_{offset,1}^{PUSCH}$ respectively. If certain multiplexing combinations are not supported, corresponding $\beta_{offset}^{PUSCH}$ values are not provided. When the PUSCH transmission would not overlap with the SR transmission occasion (as determined in step 1120), the UE, in step 1140, does not reserve REs in the PUSCH for multiplexing SR information.

Although FIGS. 9, 10, and 11 illustrates the methods 800-1100, respectively, various changes may be made to these FIGURES. For example, while the method 800 of FIG. 8, is shown as a series of steps, various steps could overlap, occur in parallel, occur in a different order, or occur multiple times. In another example, steps may be omitted or replaced by other steps. For example, steps of the methods 800-1100 can be executed in a different order.

Embodiments of the present disclosure also relate to determining a transmission power and a number of RBs for a PUCCH with UCI having multiple priority values. The following examples and embodiments, such as those described in FIGS. 12 and 13 describe procedures for determining the transmission power and the number of RBs for a PUCCH with UCI having multiple priority values.

Figure 12:
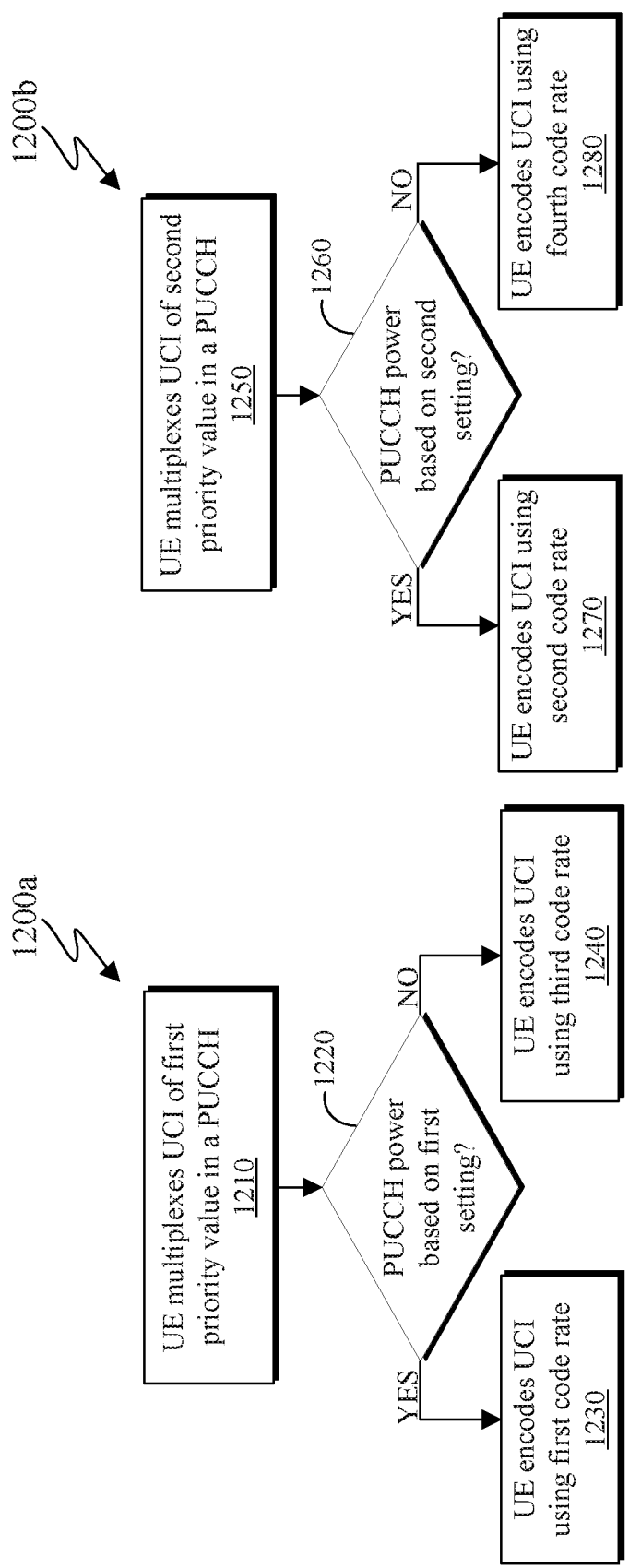
FIG. 12 illustrates an example method for a UE to determine a code rate for multiplexing UCI according to embodiments of the present disclosure.
Figure 13:
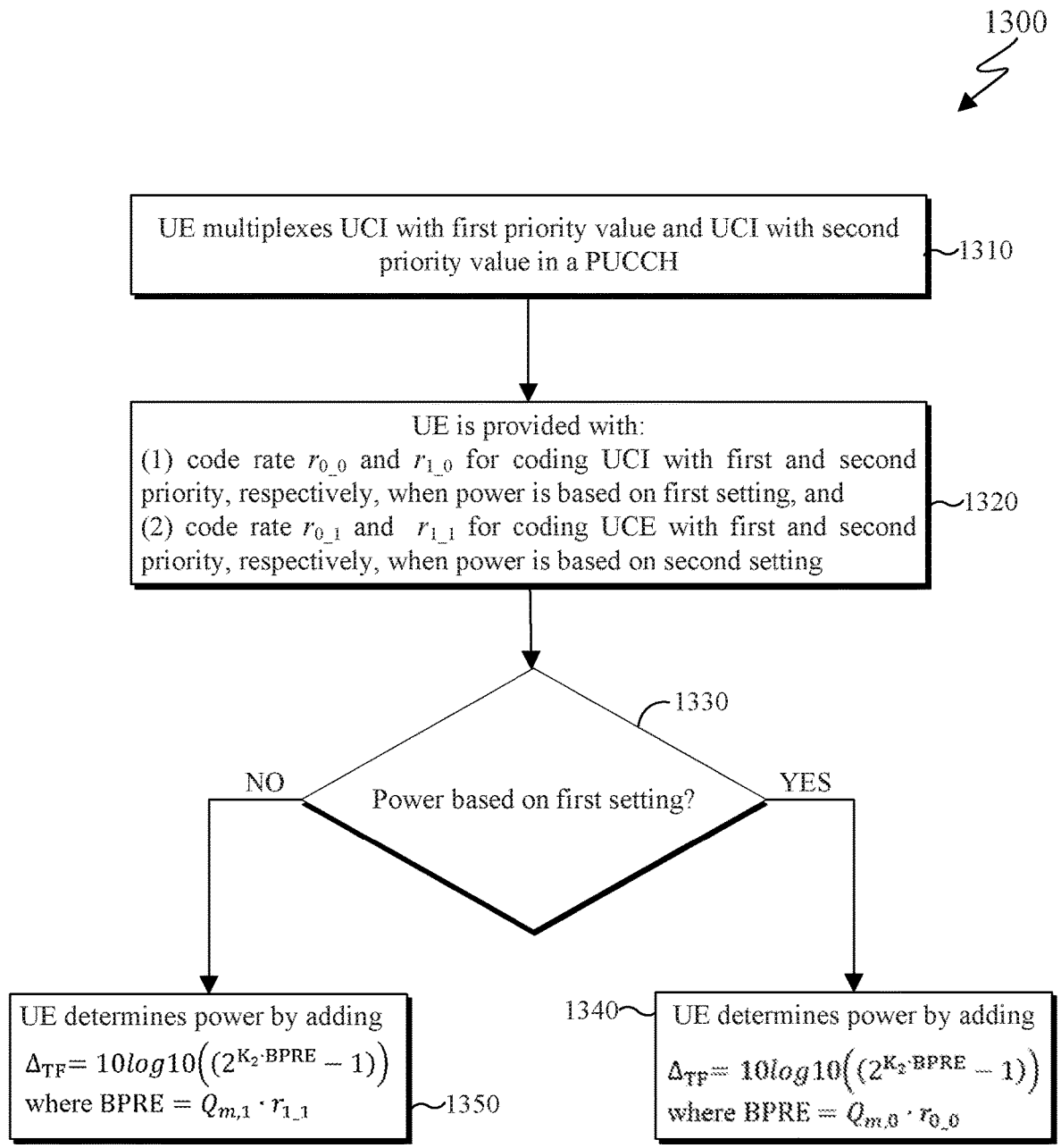
FIG. 13 illustrates an example method for a UE to determine a power for a PUCCH transmission according to embodiments of the present disclosure.

FIG. 12 illustrates an example method 1200a and 1200b for a UE to determine a code rate for multiplexing UCI according to embodiments of the present disclosure. FIG. 13 illustrates an example method 1300 for a UE to determine a power for a PUCCH transmission according to embodiments of the present disclosure. The steps of the methods 1200a, 1200b, and 1300 can be performed by any of the UEs 111-116 of FIG. 1, such as the UE 116 of FIG. 3. The methods 1200a, 1200b, and 1300 of FIGS. 12 and 13 are for illustration only and other embodiments can be used without departing from the scope of the present disclosure.

In certain embodiments, for UCI of a same priority type, the UE (such as the UE 116) multiplexes HARQ-ACK information and SR, or SR and CSI, in a same PUCCH while multiplexing of HARQ-ACK information and CSI can be disabled by higher layers. In certain embodiments, for UCI with different priority values, multiplexing can be based on a corresponding UE capability and a configuration by higher layers in order to enable a serving gNB to control a tradeoff between better a spectral efficiency from multiplexing all UCI in a PUCCH (or PUSCH) versus an increased probability for worse reception reliability at least for the UCI with priority value requiring lower BLER. Different UCI types of a smaller priority value have different motivations for being multiplexed or not with different UCI types of a larger priority value as is subsequently discussed for various cases.

A timeline for a UE to multiplex UCI of different priorities in a same PUCCH can be same as a timeline for the UE to drop transmission of a PUCCH with UCI of smaller priority value or a separate timeline can be defined for the UE to first resolve overlapping among PUCCH with different UCI types of same priority value that the UE would transmit and then multiplex the UCI of different priority values in a PUCCH that the UE transmits.

When a first PUCCH with first UCI of smaller priority value overlaps with a second PUCCH with second UCI of larger priority value, and assuming that a different BLER is targeted for the first UCI than for the second UCI, separate coding applies for the first UCI and the second UCI. If a transmission power of a PUCCH that includes both first UCI and the second UCI is determined based on $P_{O\_PUCCH,0}$ for the first PUCCH (received target power for the first PUCCH), a code rate for the second UCI needs to be smaller than a code rate for the first UCI and smaller than a code rate for the second UCI when the second UCI is multiplexed in the second PUCCH, assuming that $P_{O\_PUCCH,1} > P_{O\_PUCCH,0}$. When $P_{O\_PUCCH,0} = P_{O\_PUCCH,1}$, a same code rate can apply, and when $P_{O\_PUCCH,0} > P_{O\_PUCCH,1}$, a larger code rate can apply for the second UCI.

In a first approach, a UE (such as the UE 116) can be provided by higher layers a code rate $r_{1\_0}$ for multiplexing the second UCI in a PUCCH transmission with a power that is determined using $P_{O\_PUCCH,0}$. When the first UCI is multiplexed in a PUCCH transmission with a power that is determined using $P_{O\_PUCCH,1}$, the UE can be provided by higher layers a code rate $r_{0\_1}$ for the first UCI. Those code rates are provided separately from the ones for multiplexing the first UCI in the first PUCCH, $r_{0\_0}$, or for multiplexing the second UCI in the second PUCCH, $r_{1\_1}$.

In a second approach, for the second UCI, a code rate for multiplexing in the PUCCH with transmission power determined based on $P_{O\_PUCCH,0}$ can be same as a code rate for multiplexing in the second PUCCH with transmission power determined based on $P_{O\_PUCCH,1}$. Then, for the second UCI, in order to accommodate a transmission power difference between the PUCCH where the UE multiplexes the UCI and the second PUCCH where the UE would otherwise multiplex the second UCI if there was no overlapping with the first PUCCH, the UE can be provided a factor $\beta_{UCI,1}^{PUCCH}$ for scaling a number of REs that would be used for multiplexing the second UCI in the second PUCCH in order to determine a number of REs used for multiplexing in the PUCCH. Similar, for the first UCI and when the PUCCH transmission power is determined based on $P_{O\_PUCCH,1}$, the UE can be provided a factor $\beta_{UCI,0}^{PUCCH}$ for scaling a number of REs that would be used for multiplexing in the first PUCCH in order to determine a number of REs used for multiplexing in the PUCCH. The second approach is equivalent to the first approach when a code rate is already small and further reduction is practically equivalent to repetitions. For example, such a scenario can occur when the second UCI, that typically requires low BLER and therefore use of small code rate in the second PUCCH, is multiplexed in a PUCCH using $P_{O\_PUCCH,0}$ for determining a transmission power.

As illustrated in the FIG. 12, the methods 1200a and 1200b describe procedures for a UE (such as the UE 116) to determine a code rate for multiplexing UCI having a first or second priority value in a PUCCH transmission depending on a setting for a PUCCH transmission power.

A UE would multiplex a first UCI having a first priority value in a first PUCCH using $P_{O\_PUCCH,0}$ to determine a power for the first PUCCH transmission. Similar, a UE would multiplex a second UCI having a second priority value in a second PUCCH using $P_{O\_PUCCH,1}$ to determine a power for the second PUCCH transmission where the first and second PUCCH transmissions would overlap in time.

In step 1210, of the method 1200a, the UE multiplexes the first UCI in a PUCCH. In step 1220, the UE determines whether a PUCCH transmission power is determined based on a first setting, such as $P_{O\_PUCCH,0}$. When the PUCCH transmission power is determined based on $P_{O\_PUCCH,0}$ (as determined in step 1220), the UE, in step 1230, encodes the first UCI using a first code rate.

When the PUCCH transmission power is determined based on $P_{O\_PUCCH,1}$ (as determined in step 1220), the UE, in step 1240, encodes the first UCI using a third code rate. Alternatively, when the PUCCH transmission power is determined based on $P_{O\_PUCCH,1}$ (as determined in step 1220), the UE multiplies a number of REs determined for multiplexing the first UCI in the first PUCCH by a factor $\beta_{UCI,1}^{PUCCH}$.

In step 1250, of the method 1200b, the UE multiplexes the second UCI in the PUCCH. In step 1260, the UE determines whether the PUCCH transmission power is determined based on $P_{O\_PUCCH,1}$. When the PUCCH transmission power is determined based on $P_{O\_PUCCH,1}$ (as determined in step 1260), the UE, in step 1270 encodes the second UCI using a second code rate.

When the PUCCH transmission power is determined based on $P_{O\_PUCCH,0}$ (as determined in step 1260), the UE, in step 1280 encodes the second UCI using a fourth code rate. Alternatively, when the PUCCH transmission power is determined based on $P_{O\_PUCCH,0}$ (as determined in step 1260), the UE multiplies a number of REs determined for multiplexing the second UCI in the second PUCCH by a factor $\beta_{UCI,0}^{PUCCH}$.

In certain embodiments, the use of either $P_{O\_PUCCH,0}$ or $P_{O\_PUCCH,1}$ is predetermined, such as by the specifications of the system operation or based on a configuration by higher layers from a serving gNB. If the use of either $P_{O\_PUCCH,0}$ or $P_{O\_PUCCH,1}$ is predetermined, then the UE procedure can omit steps 1220 and 1260 and perform either steps 1230 and 1280 or steps 1240 and 1270.

In certain embodiments, in order to determine a number of RBs for a PUCCH transmission with UCI having first priority value (first UCI) and UCI having second priority value (second UCI), a PUCCH transmission power is determined. The PUCCH transmission power is determined by using $P_{O\_PUCCH,0}$ corresponding to a power setting for a first PUCCH transmission associated with the first UCI. The UE also determines a minimum number of RBs $M_{RB,0}^{PUCCH}$ for a PUCCH resource indicated by a DCI format associated with the HARQ-ACK information of first priority value, such that Equation (16) is satisfied.

$$\left(O_{ACK,0} + O_{SR,0} + O_{CSI,0} + O_{CRC,0} + \frac{r_{0\_0}}{r_{1\_0}} \cdot (O_{ACK,1} + O_{SR,1} + O_{CSI,1} + O_{CRC,1})\right) \leq \quad (16)$$
$$M_{RB,0}^{PUCCH} \cdot N_{sc,ctrl,0}^{RB} \cdot N_{symb-UCI,0}^{PUCCH} \cdot Q_{m,0} \cdot r_{0\_0}$$

where, $O_{ACK,0}$, $O_{SR,0}$, $O_{CSI,0}$, and $O_{CRC,0}$ are the numbers of HARQ-ACK information bits, SR bits, CSI bits, and CRC bits (including 0 bits) for the UCI codeword with the first UCI and $O_{ACK,1}$, $O_{SR,1}$, $O_{CSI,1}$, and $O_{CRC,1}$ are the numbers of HARQ-ACK information bits, SR bits, CSI bits, and CRC bits (including 0 bits) for the UCI codeword with second UCI. Additionally, $N_{sc,ctrl,0}^{RB}$ is a number of sub-carriers per RB excluding sub-carriers used for DM-RS transmission. $N_{symb-UCI,0}^{PUCCH}$ is a number of symbols excluding symbols used for DM-RS transmission. $Q_{m,0}$ is a modulation order for the PUCCH resource of $M_{RB,0}^{PUCCH}$ RBs that are associated with the HARQ-ACK information of first priority value. Further, $$\frac{r_{0\_0}}{r_{1\_0}}$$

is replaced by $\beta_{UCI,1}^{PUCCH}$ if, instead of a fourth code rate, the UE is provided $\beta_{UCI,1}^{PUCCH}$ to scale a number of REs for the second UCI that the UE determines based on the second code rate if the UE would multiplex the second UCI in the second PUCCH.

If for a maximum number of RBs $M_{RB,max,0}^{PUCCH}$, that the UE is provided by higher layers for determining a smaller than or equal number of REs for a PUCCH resource for the first PUCCH transmission, it is:

$$\left(O_{ACK,0} + O_{SR,0} + O_{CSI,0} + O_{CRC,0} + \frac{r_{0\_0}}{r_{1\_0}} \cdot (O_{ACK,1} + O_{SR,1} + O_{CSI,1} + O_{CRC,1})\right) > \quad (17)$$
$$M_{RB,max,0}^{PUCCH} \cdot N_{sc,ctrl,0}^{RB} \cdot N_{symb-UCI,0}^{PUCCH} \cdot Q_{m,0} \cdot r_{0\_0}$$

the UE can progressively drop CSI reports of the first UCI, if any, starting with a CSI report of largest index, and continuing in a decreasing order of CSI report indexes until, for the remaining CSI reports of the first UCI having $O_{CSI,0,rem}$ bits, as described in Equation (18).

$$\left(O_{ACK,0} + O_{SR,0} + O_{CSI,0,rem} + O_{CRC,0,rem} + \frac{r_{0\_0}}{r_{1\_0}} \cdot (O_{ACK,1} + O_{SR,1} + O_{CSI,1} + O_{CRC,1})\right) \leq \quad (18)$$
$$M_{RB,max,0}^{PUCCH} \cdot N_{sc,ctrl,0}^{RB} \cdot N_{symb-UCI,0}^{PUCCH} \cdot Q_{m,0} \cdot r_{0\_0}$$

where, $O_{CRC,0,rem}$ is a number of CRC bits when the first UCI codeword includes the remaining CSI reports. If after dropping all CSI reports of the first UCI, it is:

$$\left(O_{ACK,0} + O_{SR,0} + O_{CRC,0,xCSI,0} + \frac{r_{0\_0}}{r_{1\_0}} \cdot (O_{ACK,1} + O_{SR,1} + O_{CSI,1} + O_{CRC,1})\right) > \quad (19)$$
$$M_{RB,max,0}^{PUCCH} \cdot N_{sc,ctrl,0}^{RB} \cdot N_{symb-UCI,0}^{PUCCH} \cdot Q_{m,0} \cdot r_{0\_0}$$

the UE can also drop the HARQ-ACK information and the SR of the first UCI, where $O_{CRC,0,x,CSI}$ is a number of CRC bits after dropping all CSI reports of the first UCI. If Equation (20) below, is satisfied, the UE progressively drops CSI reports of the second UCI, if any, starting with a CSI report of largest index, and continuing in a decreasing order of CSI report indexes, until for the remaining CSI reports of the second UCI as described in Equation (21).

$$(O_{ACK,1} + O_{SR,1} + O_{CSI,1} + O_{CRC,1}) > M_{RB,max,0}^{PUCCH} \cdot N_{sc,ctrl,0}^{RB} \cdot N_{symb-UCI,0}^{PUCCH} \cdot Q_{m,0} \cdot r_{1\_0} \quad (20)$$

$$(O_{ACK,1} + O_{SR,1} + O_{CSI,1,rem} + O_{CRC,1,rem}) \leq M_{RB,max,0}^{PUCCH} \cdot N_{sc,ctrl,0}^{RB} \cdot N_{symb-UCI,0}^{PUCCH} \cdot Q_{m,0} \cdot r_{1\_0} \quad (21)$$

where, $O_{CRC,1,rem}$ is a number of CRC bits after dropping all CSI reports of the second UCI.

If after dropping all CSI reports of the second UCI, as described in Equation (22), the UE transmits the PUCCH (or the UE can additionally drop the SR bits).

$$(O_{ACK,1} + O_{SR,1} + O_{CRC,1,xCSI,1}) > M_{RB,max,0}^{PUCCH} \cdot N_{sc,ctrl,0}^{RB} \cdot N_{symb-UCI,0}^{PUCCH} \cdot Q_{m,0} \cdot r_{1\_0} \quad (22)$$

Regardless of the UCI types with corresponding priority values that are multiplexed in the PUCCH, when corresponding payloads are larger than 11 bits, the UE computes a factor, as described in Equation (23) for determining a PUCCH transmission power by using Equation (24) wherein, if all UCI bits are multiplexed in the PUCCH, $Q_m \cdot r_{0\_0}$ in Equation (24) is as described in Equation (25) while if only the UCI bits of the second priority are multiplexed in the PUCCH, $Q_m \cdot r_{0\_0}$ in Equation (24) is as described in Equation (26).

$$\Delta_{TF} = 10\log 10((2^{K_2 \cdot BPRE} - 1)) \quad (23)$$

$$BPRE = Q_m \cdot r_{0\_0}. \quad (24)$$

$$O_{ACK,0} + O_{SR,0} + O_{CSI,0} + O_{CRC,0} + \frac{r_{0\_0}}{r_{1\_0}}. \quad (25)$$

$$BPRE = \frac{(O_{ACK,1} + O_{SR,1} + O_{CSI,1} + O_{CRC,1})}{N_{RE}} = Q_{m,0} \cdot r_{0\_0}$$

-continued $$BPRE = \frac{\frac{r_{0\_0}}{r_{1\_0}} \cdot (O_{ACK,1} + O_{SR,1} + O_{CSI,1} + O_{CRC,1})}{N_{RE}} = Q_{m,0} \cdot r_{0\_0} \quad (26)$$

Similar, for determining a number of RBs for a PUCCH transmission with the first UCI and the second UCI, where a PUCCH transmission power is determined based on $P_{O\_PUCCH,1}$, the UE determines a minimum number of RBs $M_{RB,1}^{PUCCH}$ for a PUCCH resource indicated by a DCI format associated with HARQ-ACK information of the second priority value, such that Equation (27) is satisfied.

$$\left( O_{ACK,1} + O_{SR,1} + O_{CSI,1} + \right. \quad (27)$$
$$\left. O_{CRC,1} + \frac{r_{1\_1}}{r_{0\_1}} \cdot (O_{ACK,0} + O_{SR,0} + O_{CSI,0} + O_{CRC,0}) \right) \leq$$
$$M_{RB,1}^{PUCCH} \cdot N_{sc,ctrl,1}^{RB} \cdot N_{symb-UCI,1}^{PUCCH} \cdot Q_{m,1} \cdot r_{1\_1}$$

As for the case that the PUCCH transmission power is determined based on $$P_{O\_PUCCH,0}, \frac{r_{1\_1}}{r_{0\_1}}$$

is replaced by $\beta_{UCI,0}^{PUCCH}$ if, instead of a third code rate, the UE is provided $\beta_{UCI,0}^{PUCCH}$ to scale a number of REs for the first UCI that the UE determines based on the first code rate when multiplexing of the first UCI would be in the first PUCCH. The UE determines the factor $\Delta_{TF}$ as described in Equation (23) above, in order to determine a PUCCH transmission power, using Equation (28).

$$BPRE = \frac{O_{ACK,1} + O_{SR,1} + O_{CSI,1} + O_{CRC,1} + \frac{r_{1\_1}}{r_{0\_1}} \cdot (O_{ACK,0} + O_{SR,0} + O_{CSI,0} + O_{CRC,0})}{(N_{RE})} = Q_{m,1} \cdot r_{1\_1} \quad (28)$$

As illustrated in the FIG. 13, the method 1300 describes a procedure for a UE (such as the UE 116) to determine a power for a PUCCH transmission where the UE multiplexes UCI having a first priority value and UCI having a second priority value.

In step 1310, the UE multiplexes first UCI and second UCI in a PUCCH. In step 1320, the UE is provided a first code rate $r_{0\_0}$ for jointly encoding the first UCI and a fourth code rate $r_{1\_0}$ for jointly encoding the second UCI when a PUCCH transmission power is determined based on $P_{O\_PUCCH,0}$. Additionally, in step 1320, the UE the UE is provided a third code rate $r_{0\_1}$ for jointly encoding the first UCI and a second code rate $r_{1\_1}$ for jointly encoding the second UCI when a PUCCH transmission power is determined based on $P_{O\_PUCCH,1}$. In certain embodiments, instead of the third and fourth code rates, the UE can be provided first and second scaling factors, $\beta_{UCI,0}^{PUCCH}$ and $\beta_{UCI,1}^{PUCCH}$, respectively, as previously described.

In step 1330, the UE determines whether a power of the PUCCH transmission is based on one of $P_{O\_PUCCH,0}$ and $P_{O\_PUCCH,1}$. When the PUCCH transmission power is based on $P_{O\_PUCCH,0}$ (as determined in step 1330), the UE, in step 1340, encodes the first UCI using the first code rate $r_{0\_0}$ and encodes the second UCI using the fourth code rate $r_{1\_0}$.

Alternatively, in step 1340, the UE encodes the second UCI using the second code rate $r_{1\_1}$ and scales the resulting REs by $\beta_{UCI,1}^{PUCCH}$. In step 1340, the UE further determines a power for the PUCCH transmission by adding a value of Equation (23) in dBm where $BPRE=Q_{m,0} \cdot r_{0\_0}$.

When the PUCCH transmission is based on $P_{O\_PUCCH,1}$ (as determined in step 1330), the UE, in step 1350 encodes the first UCI using the third code rate $r_{0\_1}$. Alternatively, in step 1350, the UE encodes the first UCI using the first code rate $r_{0\_0}$ and scales the resulting REs by $\beta_{UCI,0}^{PUCCH}$, and encodes the second UCI using the second code rate $r_{1\_1}$. Additionally, the UE determines a power for the PUCCH transmission by adding a value of Equation (23) in dBm where $BPRE=Q_{m,1} \cdot r_{1\_1}$.

In certain embodiments, the UE is provided only one of the fourth code rate and the third code rate, or only one of $\beta_{UCI,1}^{PUCCH}$ and $\beta_{UCI,0}^{PUCCH}$, if a power of the PUCCH transmission is determined according to one of $P_{O\_PUCCH,0}$ and $P_{O\_PUCCH,1}$, respectively, as configured by a serving gNB by higher layers or as specified in the system operation. In this example, the UE does not perform step 1330 and either step 1350 or step 1340, respectively.

In certain embodiments, using separate encoding for the first UCI and for the second UCI can result to a use of different encoding methods for the first UCI and the second UCI. For example, the first UCI can be encoded using polar coding while the second UCI can be encoded using Reed-Mueller (RM) coding. Then, if only the first UCI would be transmitted in a first PUCCH, the BPRE of Equation (23) is described in Equation (29).

$$BPRE=(O_{ACK,0}+O_{SR,0}+O_{CSI,0}+O_{CRC,0})/N_{RE}= Q_{m,0} \cdot r_{0\_0} \quad (29)$$

If only the second UCI would be transmitted in a second PUCCH, the BPRE Equation of Equation (30) is described in Equation (31). When the first UCI and the second UCI are multiplexed in a same PUCCH transmission, a procedure to determine $\Delta_{TF}$ needs to be defined.

$$\Delta_{TF}=10 \log 10(K_1 \cdot BPRE) \quad (30)$$

$$BPRE=(n_{HARQ-ACK,1}+O_{SR,1}+O_{CSI,1})/N_{RE} \quad (31)$$

In a first approach, the coding gains of RM coding resulting from known information values can be neglected and $\Delta_{TF}$ can be determined as previously described in Equation (23) also in case of RM coding and assuming $O_{ACK,1}$ instead of $n_{HARQ-ACK,1}$. Although for small UCI payloads the spectral efficiency curve is better approximated as Equation (30) instead of Equation (23), the difference in a resulting PUCCH transmission power is not significant when also having separately encoded UCI, such as the first UCI, when Equation (23) is applicable for the first UCI.

In a second approach, Equation (23) can be used based only on one UCI, such as the first UCI, using polar coding. Then, $N_{RE}$ needs to be adjusted to reflect only a portion of all REs that correspond to the UCI with payload above 11 bits (payload threshold for use of polar coding). For example, when a power setting $P_{O\_PUCCH,0}$ corresponding to the first PUCCH transmission is used to determine a PUCCH transmission power, and denoting by Equation (32) or Equation (33) a total number of UCI bits (including CRC bits, if any), the portion of REs used for transmission of the first UCI results in Equation (34) or Equation (35), respectively. Then, BPRE is based on Equation (36) or Equation (37), respectively.

$$O_{UCI,0} + \frac{r_{0\_0}}{r_{1\_0}} \cdot O_{UCI,1} \qquad (32)$$

$$O_{UCI,0} + \beta_{UCI,1}^{PUCCH} \cdot O_{UCI,1} \qquad (33)$$

$$O_{UCI,0} \cdot N_{RE} \bigg/ \left( O_{UCI,0} + \frac{r_{0\_0}}{r_{1\_0}} O_{UCI,1} \right) \qquad (34)$$

$$O_{UCI,0} \cdot N_{RE} / \left( O_{UCI,0} + \beta_{UCI,1}^{PUCCH} \cdot O_{UCI,1} \right) \qquad (35)$$

$$BPRE = O_{UCI,0} \bigg/ \left( O_{UCI,0} \cdot N_{RE} \bigg/ \left( O_{UCI,0} + \frac{r_{0\_0}}{r_{1\_0}} \cdot O_{UCI,1} \right) \right) = \qquad (36)$$

$$\left( O_{UCI,0} + \frac{r_{0\_0}}{r_{1\_0}} \cdot O_{UCI,1} \right) \bigg/ N_{RE}$$

$$BPRE = \left( O_{UCI,0} + \beta_{UCI,1}^{PUCCH} \cdot O_{UCI,1} \right) / N_{RE} \qquad (37)$$

Similar, when $P_{O\_PUCCH,1}$ is used to determine a PUCCH transmission power, and denoting by Equation (38) or Equation (39) a total number of UCI bits (including CRC bits), the BPRE is based on Equation (40) or Equation (41), respectively.

$$O_{UCI,1} + \frac{r_{1\_1}}{r_{0\_1}} \cdot O_{UCI,0} \qquad (38)$$

$$O_{UCI,1} + \beta_{UCI,0}^{PUCCH} \cdot O_{UCI,0} \qquad (39)$$

$$BPRE = O_{UCI,1} \bigg/ \left( O_{UCI,1} \cdot N_{RE} \bigg/ \left( O_{UCI,1} + \frac{r_{1\_1}}{r_{0\_1}} \cdot O_{UCI,0} \right) \right) = \qquad (40)$$

$$\left( O_{UCI,1} + \frac{r_{1\_1}}{r_{0\_1}} \cdot O_{UCI,0} \right) \bigg/ N_{RE}$$

$$BPRE = \left( O_{UCI,1} + \beta_{UCI,0}^{PUCCH} \cdot O_{UCI,0} \right) / N_{RE} \qquad (41)$$

The second approach can be extended to when RM coding is used for both the first UCI bits and the second UCI bits. Then, for determining a BPRE value for a $\Delta_{TF}$ component to compute a power for the PUCCH transmission, an $O_{ACK}$ component in the first UCI bits $O_{UCI,0}$ or in the second UCI bits $O_{UCI,1}$ can be replaced by a corresponding $n_{HARQ-ACK}$.

In certain embodiments, for specific realizations for the number of the first UCI bits or for the number of the second UCI bits, joint coding can apply to realize coding gains. For example, such a realization is when only one or two first UCI bits are multiplexed with second UCI bits. In such case, the first UCI bits can be jointly coded with the second UCI bits using a coding method corresponding to a total payload of first UCI bits and second UCI bits. For determination of a PUCCH resource or of a power for the PUCCH transmission, the first UCI bits can be considered as second UCI bits. The placement of the first UCI bits can be at the beginning or at the end of the codeword with the combined first UCI bits and second UCI bits.

In certain embodiments, for specific realizations for the number of first UCI bits or the number of second UCI bits, multiplexing in a same PUCCH can be precluded. Such a realization is when one or two first UCI bits are multiplexed with one or two second UCI bits. Then, any coding gains from joint coding are small and an alternative to multiplexing the first UCI bits, either with separate coding or with joint coding, with the second UCI bits in a PUCCH is to drop the first PUCCH with the first UCI bits and transmit only the second PUCCH with the second UCI bits.

A UE procedure for separately or jointly coding the first UCI and the second UCI or for dropping the first UCI depending on conditions such as a payload for the first UCI, can be configured to the UE by a serving gNB through higher layer signaling.

To maintain a large reliability, such as a $10^{-5}$ BLER for the second UCI codeword having the larger priority value, a code rate is typically low and further reduction may not be possible or beneficial. Further, a number of first UCI bits or second UCI bits can be 1 or 2 and only repetition coding is possible in practice. Then, as previously described, instead of configuring a code rate for multiplexing the second UCI in a PUCCH transmission with power determined based on $P_{O\_PUCCH,0}$, the code rate can remain as when the multiplexing of the second UCI is in a PUCCH transmission with power determined based on $P_{O\_PUCCH,1}$ and $r_{0\_0}/r_{1\_0}$ can be replaced by $\beta_{UCI,1}^{PUCCH}$ to indicate a factor to increase a corresponding number of REs (over a number of REs that would be used for multiplexing the second UCI in the second PUCCH), wherein the repetitions corresponding to $\beta_{UCI,1}^{PUCCH}$ adjust for a power difference between $P_{O\_PUCCH,0}$ and $P_{O\_PUCCH,1}$. Similar adjustments can be made by replacing $r_{1\_1}/r_{0\_1}$ by $\beta_{UCI,0}^{PUCCH}$ when the first UCI is multiplexed in a PUCCH transmission with power determined using $P_{O\_PUCCH,1}$.

Although FIGS. 12 and 13 illustrates the methods 1200a, 1200b, and 1300, various changes may be made to these FIGURES. For example, while the method 1300 of FIG. 13, is shown as a series of steps, various steps could overlap, occur in parallel, occur in a different order, or occur multiple times. In another example, steps may be omitted or replaced by other steps. For example, steps of the methods 1200a, 1200b, and 1300 can be executed in a different order.

Embodiments of the present disclosure also relate to determining parameters for a PUCCH transmission with UCI having multiple priority values. The following examples and embodiments, such as those described in FIG. 14, describe determining parameters for the PUCCH transmission with UCI having multiple priority values. For example, a determination of parameters, such as UCI contents or power, for a PUCCH transmission can include a UCI having multiple priority values.

Figure 14:
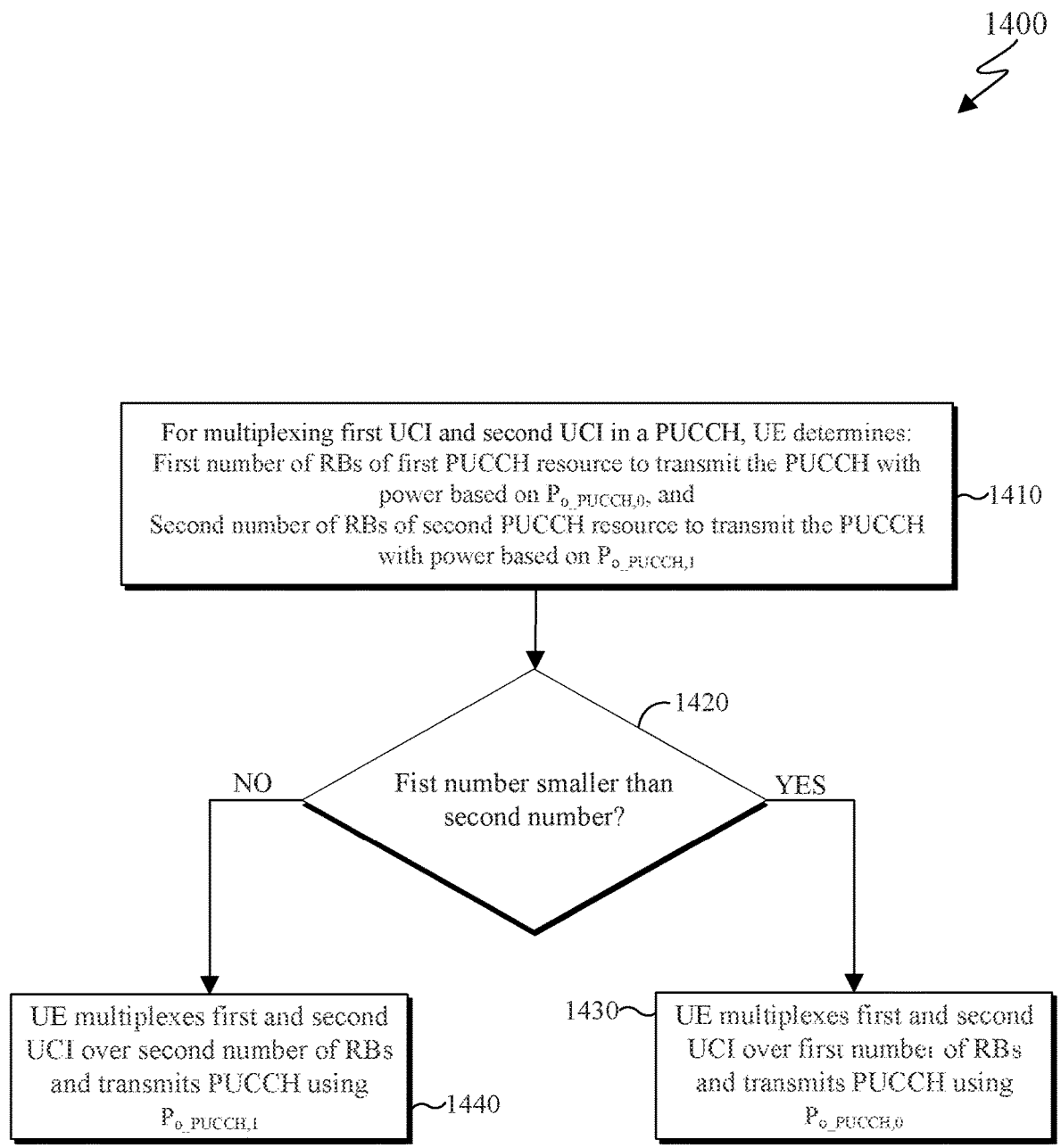
FIG. 14 illustrates an example method for a UE to determine a PUCCH resource according to embodiments of the present disclosure.

FIG. 14 illustrates an example method 1400 for a UE to determine a PUCCH resource according to embodiments of the present disclosure. The steps of the method 1400 can be performed by any of the UEs 111-116 of FIG. 1, such as the UE 116 of FIG. 3. The method 1400 of FIG. 14 is for illustration only and other embodiments can be used without departing from the scope of the present disclosure.

In certain embodiments, specification of system operation or a BS (such as the BS 102) enables multiplexing of UCI types with different priorities in a PUCCH transmission only for specific UCI types. For example, the BS can enable HARQ-ACK information or SR having a first priority value to be multiplexed with UCI having a second priority value but can disable such multiplexing for CSI having the first priority value. Further, the BS can enable multiplexing of UCI with different priorities in a PUCCH transmission only for up to a maximum payload for the UCI having the first priority value; for payloads above the maximum payload, the UCI having the first priority is not multiplexed or is multiplexed up to the maximum payload where HARQ-ACK information bits are multiplexed with priority to SR bits or CSI bits. For example, the BS can provide the maximum payload to the UE using higher layer signaling. A PUCCH that includes UCI with multiple priority values has a priority value that is equal to the largest UCI priority value.

A UE (such as the UE 116) can be configured by a serving gNB (such as the BS 102) whether to use a PUCCH resource associated with a first PUCCH or a PUCCH resource associated with the second PUCCH for determining a PUCCH resource for a PUCCH that includes UCI having first priority value (first UCI) and UCI having second priority value (second UCI). For example, when a latency of the second UCI may not be possible to always achieve by using a resource associated with the first PUCCH, the serving gNB can configure the UE to use only PUCCH resources associated with the second PUCCH. For example, when a latency of the second UCI can be ensured when using a PUCCH resource associated with a first PUCCH, the serving gNB can configure the UE to use only PUCCH resources associated with the first PUCCH, or to use both PUCCH resources associated with the first PUCCH and PUCCH resources associated with the second PUCCH. Using PUCCH resources associated with the first PUCCH can be beneficial particularly when the payload of the first UCI payload is larger than the payload of the second UCI and corresponding PUCCH resources that can accommodate multiplexing of both first and second UCIs are likely to be the ones associated with the first PUCCH. It is also possible to include a 1-bit field in a DCI format scheduling PDSCH receptions with first priority type or with second priority type, associated with the first UCI or with the second UCI respectively, to indicate whether a PUCCH resource used for a PUCCH transmission that includes the first UCI and the second UCI is from a first set of PUCCH resources associated with the first PUCCH for the first UCI or from a second set of PUCCH resources associated with the second PUCCH for the second UCI. It is also possible to always use a PUCCH resource from the second set of PUCCH resources.

In certain embodiments, a serving gNB (such as the BS 102) does not configure a UE (such as the UE 116) to use a particular PUCCH resource and the UE considers all PUCCH resources that satisfy a timeline condition for multiplexing the first UCI and the second UCI. For determination of a transmission power, a resource corresponding to the first or second PUCCH transmission can be associated with power determined based on $P_{O\_PUCCH,0}$ or $P_{O\_PUCCH,1}$ for the first or second PUCCH transmission, respectively, or can always be associated with a power based on one of $P_{O\_PUCCH,0}$ and $P_{O\_PUCCH,1}$ as determined in the specifications of the system operation or as configured by a serving gNB by higher layer signaling.

For example, the UE can determine a number of RBs $M_{RB,0}^{PUCCH}$ that satisfy Equation (16), if any, when the PUCCH resource is associated with the first PUCCH transmission that has power determined based on $P_{O\_PUCCH,0}$. The UE can also determine a number of RBs $M_{RB,1}^{PUCCH}$ that satisfy Equation (27), if any, when the PUCCH resource is associated with the second PUCCH transmission that has power determined based on $P_{O\_PUCCH,1}$. The UE can also select the smaller of $M_{RB,0}^{PUCCH}$ and $M_{RB,1}^{PUCCH}$, multiplex the first UCI and the second UCI according to Equation (16) or Equation (27), respectively. Thereafter the UE transmits the PUCCH with a power determined based on $P_{O\_PUCCH,0}$ or based on $P_{O\_PUCCH,1}$, respectively. If $M_{RB,0}^{PUCCH} = M_{RB,1}^{PUCCH}$, the UE can be configured or can be predetermined in the system operation, to select either $M_{RB,0}^{PUCCH}$ or $M_{RB,1}^{PUCCH}$ for the PUCCH transmission where the UE multiplexes the first UCI and the second UCI. If there is no number of RBs that satisfies Equation (16) and Equation (27), a predetermined condition can apply such as selecting the maximum number of RBs associated with the first PUCCH transmission, or selecting the maximum number of RBs associated with the second PUCCH transmission.

Alternatively, a selection can be for the maximum number of RBs associated either with the first PUCCH transmission, $M_{RB,max,0}^{PUCCH}$, or with the second PUCCH transmission, $M_{RB,max,1}^{PUCCH}$, based on the larger of the ratios of Equation (42) and (43).

$$\frac{\left(O_{ACK,0} + O_{SR,0} + O_{CSI,0} + O_{CRC,0} + \beta_{UCI,1}^{PUCCH} \cdot (O_{ACK,1} + O_{SR,1} + O_{CSI,1} + O_{CRC,1})\right)}{M_{RB,max,0}^{PUCCH} \cdot N_{sc,ctrl,0}^{RB} \cdot N_{symb-UCI,0}^{PUCCH} \cdot Q_{m,0} \cdot r_{0\_0}} \quad (42)$$

$$\frac{\left(O_{ACK,1} + O_{SR,1} + O_{CSI,1} + O_{CRC,1} + \beta_{UCI,0}^{PUCCH} \cdot (O_{ACK,0} + O_{SR,0} + O_{CSI,0} + O_{CRC,0})\right)}{M_{RB,max,1}^{PUCCH} \cdot N_{sc,ctrl,1}^{RB} \cdot N_{symb-UCI,1}^{PUCCH} \cdot Q_{m,1} \cdot r_{1_1}} \quad (43)$$

As illustrated in the FIG. 14, the method 1400 describes a procedure for a UE (such as the UE 116) to determine a PUCCH resource, from a first set of PUCCH resources or from a second set of PUCCH resources, to transmit a PUCCH where the UE multiplexes UCI having a first priority value and UCI having a second priority value.

For multiplexing first UCI having a first priority value (first UCI) and second UCI having a second priority value (second UCI) in a PUCCH, the UE, in step 1410, determines a first number of RBs and a second number of RBs. The first number of Ins are associated with a first PUCCH resource for transmission of the PUCCH with power determined based on a first power setting $P_{O\_PUCCH,0}$. The second number of RBs are associated with a second PUCCH resource for transmission of the PUCCH with power determined based on a second power setting $P_{O\_PUCCH,1}$.

In step 1420, the UE determines the smaller of the first number of RBs and the second number of RBs. If the first number of RBs is smaller (as determined in step 1420), the UE, in step 1430, multiplexes the first UCI and the second. UCI over the first number of RBs and transmits a corresponding PUCCH with power determined based on a first power setting $P_{O\_PUCCH,0}$. If the second number of RBs is smaller (as determined in step 1420), the UE, in step 1440, multiplexes the first UCI and the second UCI over the second number of RBs and transmits a corresponding PUCCH with power determined based on a second power setting $P_{O\_PUCCH,1}$.

Typically, as $P_{O\_PUCCH,1} > P_{O\_PUCCH,0}$, it is $M_{RB,0}^{PUCCH} > M_{RB,1}^{PUCCH}$. Then, a modified criterion for the operation in FIG. 14 would be to select the smaller of $P_{O\_PUCCH,0} - 10 \log 10 (M_{RB,0}^{PUCCH})$ and $P_{O\_PUCCH,1} - 10 \log 10 (M_{RB,1}^{PUCCH})$ or, in general, a smaller of a metric that combines for the PUCCH transmission power and the number of PUCCH RBs.

Alternatively, a PUCCH transmission can always be with a predetermined power setting, such as $P_{O\_PUCCH,1}$, or the larger or the smaller of $P_{O\_PUCCH,0}$ and $P_{O\_PUCCH,1}$, or based on one of the power setting $P_{O\_PUCCH,0}$ and $P_{O\_PUCCH,1}$ as indicated by higher layers by a serving gNB. Then, only Equation (16) (in case $P_{O\_PUCCH,0}$ applies) or only Equation (27) (in case $P_{O\_PUCCH,1}$ applies) is used. The UE can consider both PUCCH resources associated with the first PUCCH transmission and the PUCCH resources associated with the second PUCCH transmission, or can consider only the PUCCH resources associated with the second PUCCH transmission, for determining a PUCCH resource for the PUCCH transmission with the first and the second UCI.

To minimize a decoding latency for a UCI having a second priority value (second UCI) when a PUCCH resource from the PUCCH resources for the first PUCCH transmission is used for multiplexing, the second UCI (having larger priority value) is multiplexed prior to the first UCI (having smaller priority value). For UCI multiplexing, mapping is first in frequency in ascending order of available sub-carriers of a symbol, and then in time across available symbols, starting from a first symbol of the PUCCH transmission (excluding sub-carriers/symbols used for DM-RS transmission). Otherwise, for example, when the PUCCH resource is over 14 symbols and the maximum number of symbols for a PUCCH resource from the PUCCH resources for the second PUCCH transmission is 4 symbols, a target latency for the second UCI may not be achieved. Earlier mapping of the second UCI is enabled by having separate coding from the first UCI and by applying frequency first mapping.

In certain embodiments, a position of a first DM-RS for PUCCH formats 3 and 4 is shifted to earlier symbols in order to enable faster channel estimation and demodulation of received UCI symbols. For example, for a PUCCH transmission using PUCCH format 3 or a PUCCH format 4 over 8 symbols, DM-RS is located on the second and sixth symbols. For a UE supporting multiplexing of UCI types with different priority values, the DM-RS location can be shifted to the first and fifth symbols. For example, for a PUCCH transmission using PUCCH format 3 or a PUCCH format 4 over 14 symbols and using two DM-RS symbols, DM-RS is located on the fourth and eleventh symbols. For a UE supporting multiplexing of UCI types with different priority values, the DM-RS location can be shifted to the first and eighth symbols or to the second and ninth symbols. In general, a shift to earlier symbol(s) can be specified for the DM-RS location(s) for PUCCH format 3 or PUCCH format 4 when multiplexing of UCI types with different priorities particularly when a PUCCH resource is one used for the first PUCCH transmission. A shift to earlier symbol(s) for the DM-RS location(s) for PUCCH format 3 or PUCCH format 4 may not apply when multiplexing of UCI types with different priorities particularly when a PUCCH resource is one used for the second PUCCH transmission.

Although FIG. 14 illustrates the method 1400, various changes may be made to this FIGURE. For example, while the method 1400 of FIG. 14 is shown as a series of steps, various steps could overlap, occur in parallel, occur in a different order, or occur multiple times. In another example, steps may be omitted or replaced by other steps. For example, steps of the method 1400 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for a user equipment (UE) to transmit physical uplink control channels (PUCCHs), the method comprising:
    determining transmissions of first PUCCHs having a first priority value and of a second PUCCH having a second priority value, wherein the second priority value is higher than the first priority value;
    resolving a first overlapping in time among the first PUCCHs to identify a resource for a third PUCCH that has the first priority value, wherein the third PUCCH includes first acknowledgement information;
    resolving a second overlapping in time among fourth PUCCHs having the second priority value to identify a resource for the second PUCCH;
    resolving a third overlapping in time between the third PUCCH and the second PUCCH, wherein the second PUCCH includes second acknowledgement information; and
    transmitting the second PUCCH, wherein the second acknowledgement information is multiplexed prior to the first acknowledgement information in the second PUCCH.

2. The method of claim 1, wherein resolving the first overlapping and resolving the third overlapping are subject to a same timeline condition.

3. The method of claim 1, wherein:
    the second PUCCH includes first uplink control information (UCI) having the first priority value and second UCI having the second priority value,
    the first UCI includes one or more of acknowledgement information, scheduling request, and channel state information,
    the second UCI includes one or more of acknowledgement information and scheduling request,
    the first UCI is encoded jointly,
    the second UCI is encoded jointly, and
    the first UCI is encoded separately from the second UCI.

4. The method of claim 1, further comprising:
    receiving:
        first information for a first set of PUCCH resources associated with the first PUCCHs, and
        second information for a second set of PUCCH resources associated with the second PUCCH,
    wherein resolving the third overlapping in time between the third PUCCH and the second PUCCH comprises determining a resource for the second PUCCH from the second set of PUCCH resources.

5. A user equipment (UE) comprising:
    a processor configured to:
        determine transmissions of first physical uplink control channels (PUCCHs) having a first priority value and of a second PUCCH having a second priority value, wherein the second priority value is higher than the first priority value;

resolve a first overlapping in time among the first PUCCHs to identify a resource for a third PUCCH that has the first priority value, wherein the third PUCCH includes first acknowledgement information;

resolve a second overlapping in time among fourth PUCCHs having the second priority value to identify a resource for the second PUCCH; and resolve a third overlapping in time between the third PUCCH and the second PUCCH, wherein the second PUCCH includes second acknowledgement information; and a transceiver operably coupled to the processor, the transceiver configured to transmit the second PUCCH, wherein the second acknowledgement information is multiplexed prior to the first acknowledgement information in the second PUCCH.

6. The UE of claim 5, wherein the processor is further configured to resolve the first overlapping and resolve the third overlapping subject to a same timeline condition.

7. The UE of claim 5, wherein:
the processor is further configured to:
jointly encode a first uplink control information (UCI),
jointly encode a second UCI, and
separately encode the first UCI and the second UCI,
the second PUCCH includes the first UCI having the first priority value and the second UCI having the second priority value,
the first UCI includes one or more of acknowledgement information, scheduling request, and channel state information, and
the second UCI includes one or more of acknowledgement information and scheduling request.

8. The UE of claim 5, wherein:
the transceiver is further configured to receive:
first information for a first set of PUCCH resources associated with the first PUCCHs, and
second information for a second set of PUCCH resources associated with the second PUCCH,
to resolve the third overlapping in time between the third PUCCH and the second PUCCH, the processor is further configured to determine a resource for the second PUCCH from the second set of PUCCH resources.

9. A base station comprising:
a processor; and
a transceiver operably coupled to the processor, the transceiver configured to transmit configuration information for multiplexing of control information in physical uplink control channels (PUCCHs),
wherein receptions of first PUCCHs have a first priority value and of a second PUCCH have a second priority value,
wherein the second priority value is higher than the first priority value,
wherein a first overlapping in time among the first PUCCHs is resolved to identify a resource for a third PUCCH that has the first priority value,
wherein the third PUCCH is for first acknowledgement information,
wherein a second overlapping in time among fourth PUCCHs having the second priority value is resolved to identify a resource for the second PUCCH,
wherein a third overlapping in time between the third PUCCH and the second PUCCH is resolved,
wherein the second PUCCH is for second acknowledgement information,
wherein the transceiver is further configured to receive the second PUCCH, and
wherein the processor is further configured to demultiplex, in the second PUCCH, the second acknowledgement information prior to the first acknowledgement information.

10. The base station of claim 9, wherein the first overlapping and the third overlapping are resolved subject to a same timeline condition.

11. The base station of claim 9, wherein:
the processor is further configured to:
jointly decode a first uplink control information (UCI),
jointly decode a second UCI, and
separately decode the first UCI and the second UCI,
the second PUCCH includes the first UCI having the first priority value and the second UCI having the second priority value,
the first UCI includes one or more of acknowledgement information, scheduling request, and channel state information, and
the second UCI includes one or more of acknowledgement information and scheduling request.

* * * * *